(12) United States Patent
La Posta

(10) Patent No.: US 11,845,519 B2
(45) Date of Patent: Dec. 19, 2023

(54) RELEASABLE FASTENING SYSTEM AND ARTICLES USING SAME

(71) Applicant: Daniele La Posta, Medford, MA (US)

(72) Inventor: Daniele La Posta, Medford, MA (US)

( * ) Notice: Subject to any disclaimer, the term of this patent is extended or adjusted under 35 U.S.C. 154(b) by 239 days.

(21) Appl. No.: 17/350,960

(22) Filed: Jun. 17, 2021

(65) Prior Publication Data

US 2021/0394871 A1    Dec. 23, 2021

Related U.S. Application Data

(60) Provisional application No. 63/040,217, filed on Jun. 17, 2020.

(51) Int. Cl.
| | |
|---|---|
| *B63B 32/53* | (2020.01) |
| *F16B 2/08* | (2006.01) |
| *B63B 32/66* | (2020.01) |
| *B63B 32/40* | (2020.01) |
| *F16B 2/18* | (2006.01) |

(52) U.S. Cl.
CPC ............. *B63B 32/53* (2020.02); *B63B 32/40* (2020.02); *B63B 32/66* (2020.02); *F16B 2/185* (2013.01)

(58) Field of Classification Search
CPC ........... B63B 7/04; B63B 32/53; B63B 34/23; B63B 32/40; B63B 32/66; F16B 21/165; F16B 2/185
See application file for complete search history.

(56) References Cited

U.S. PATENT DOCUMENTS

| | | | | |
|---|---|---|---|---|
| 2,901,804 A | * | 9/1959 | Williams | .............. F16B 21/165 74/41 |
| 2006/0261654 A1 | * | 11/2006 | Stallman | .............. A47C 15/004 297/310 |
| 2014/0315454 A1 | * | 10/2014 | Barr | ........................ B63B 32/53 441/74 |
| 2014/0318435 A1 | * | 10/2014 | Murray, III | ............ B63H 21/30 114/77 R |
| 2021/0354792 A1 | * | 11/2021 | Niemier | .................... B63B 3/46 |

* cited by examiner

*Primary Examiner* — Andrew Polay
(74) *Attorney, Agent, or Firm* — Prince Lobel Tye LLP

(57) ABSTRACT

An article with at least two partially or fully separable portions that are configured to be securely fastened together to assemble the completed article. There are a plurality of releasable fastening mechanism, each fastening mechanism located in part in each of two adjoining portions that are configured to be joined together.

14 Claims, 31 Drawing Sheets

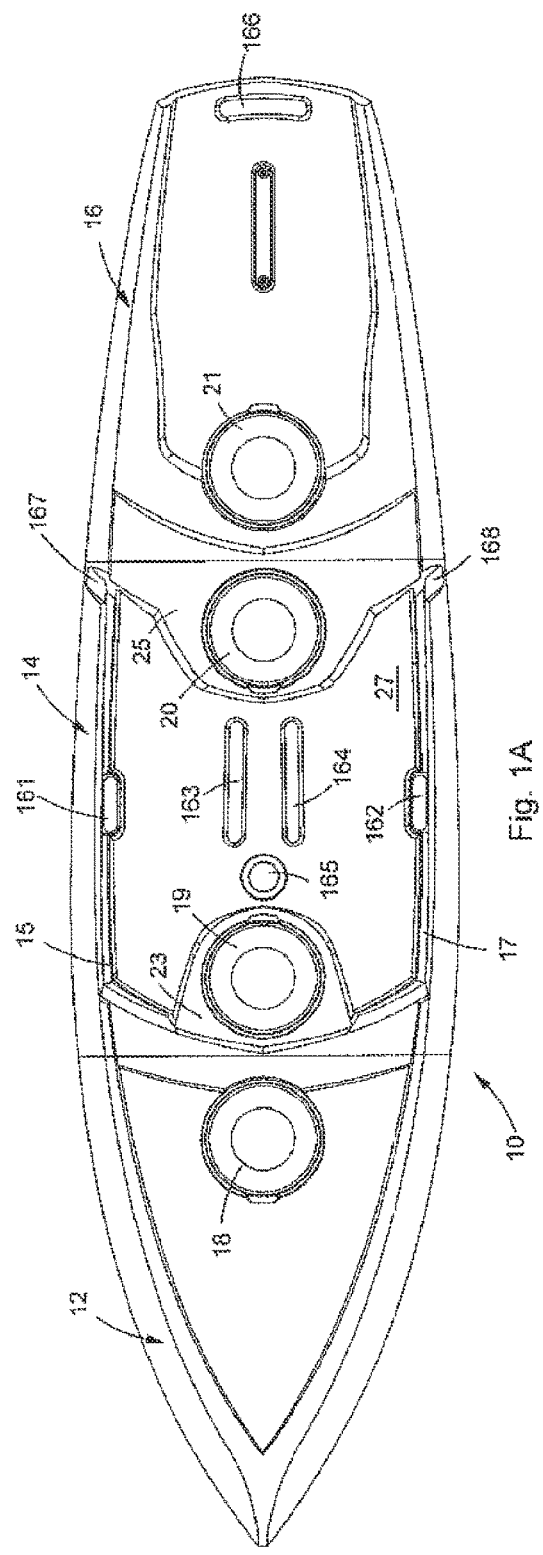

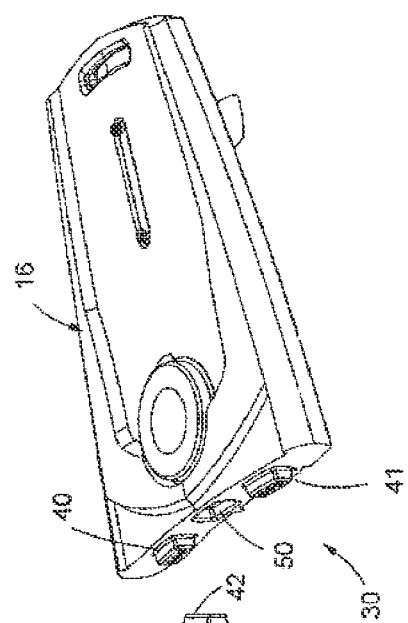
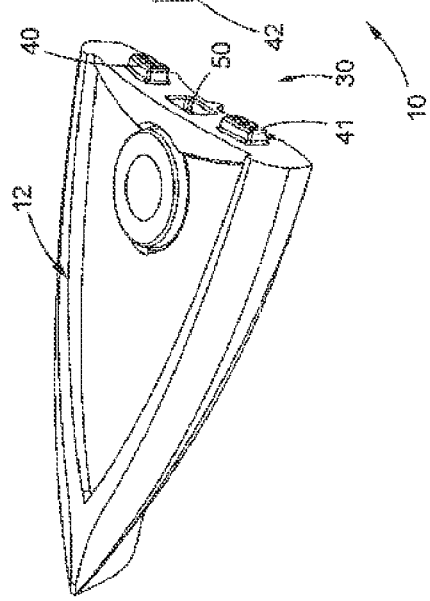
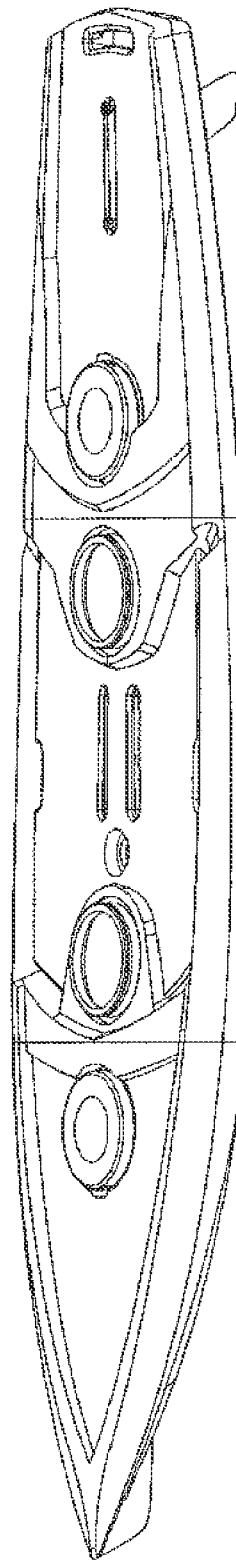
Fig. 2B
Fig. 2A

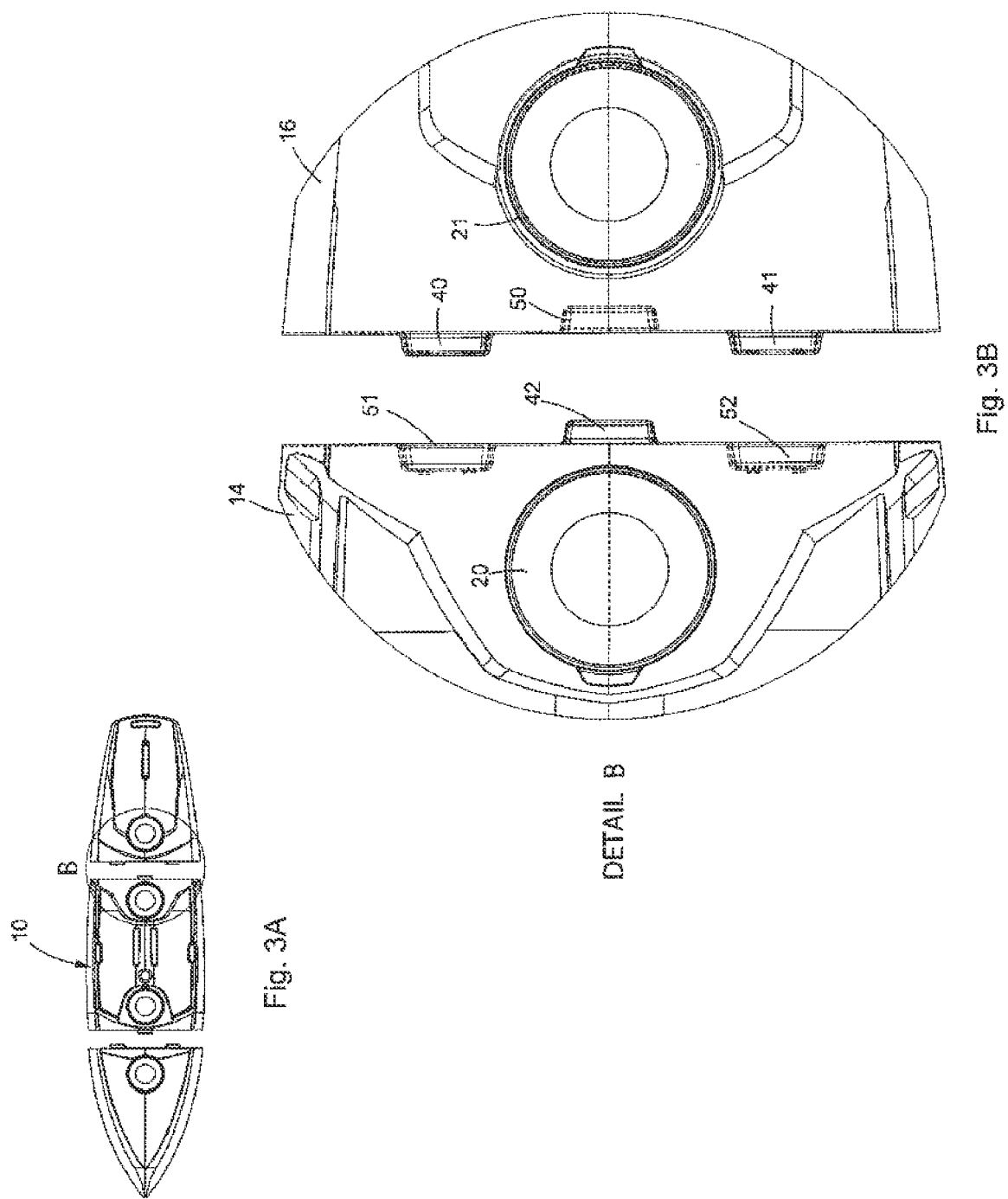

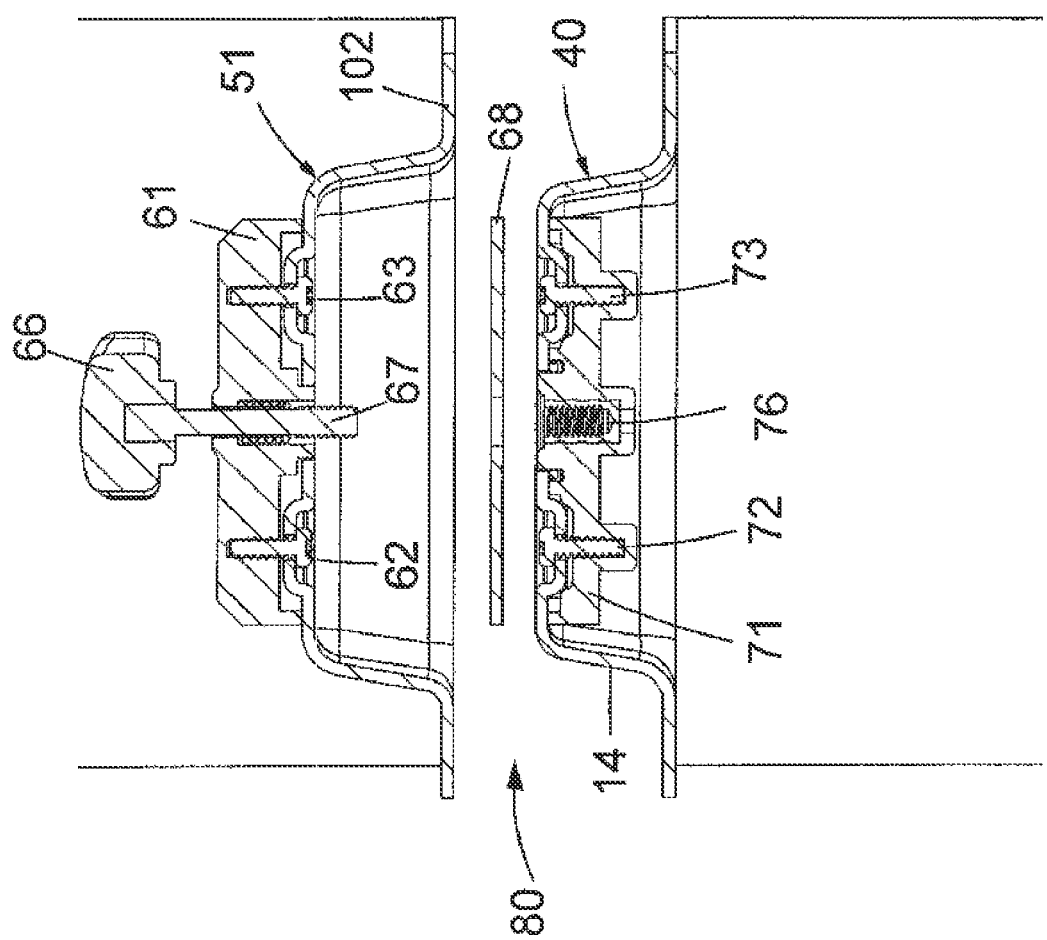

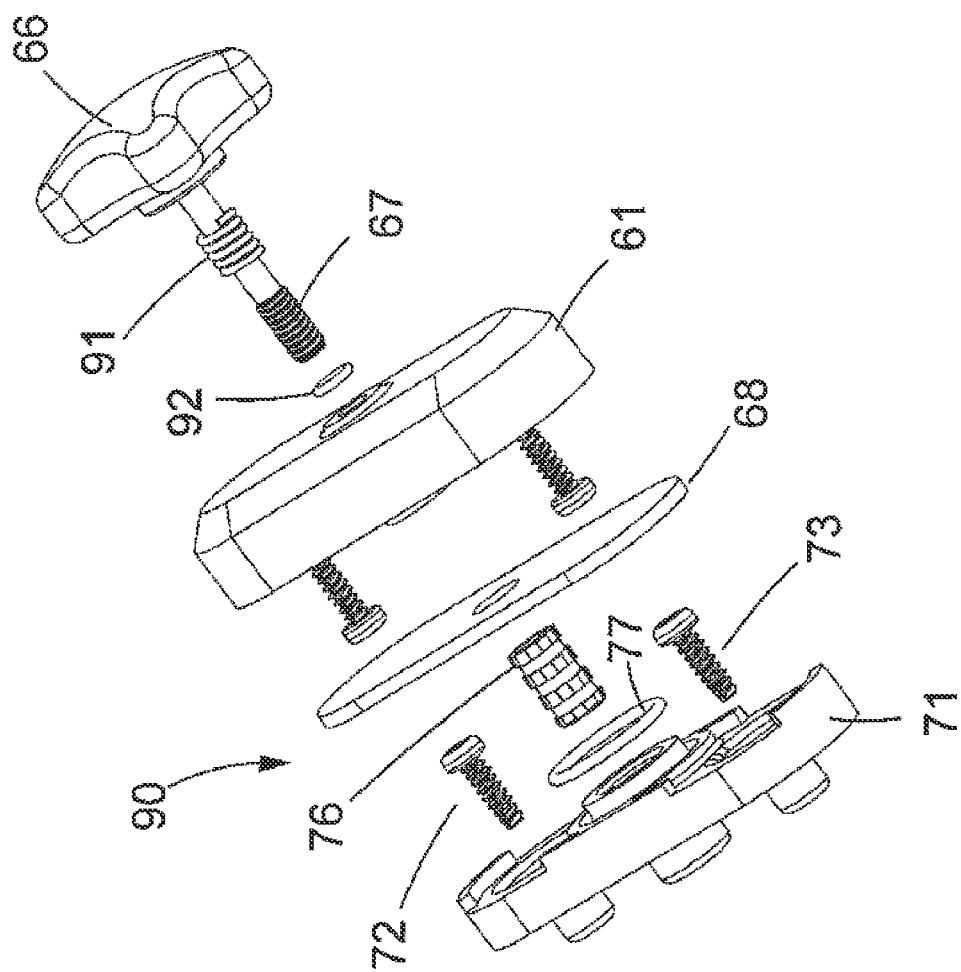

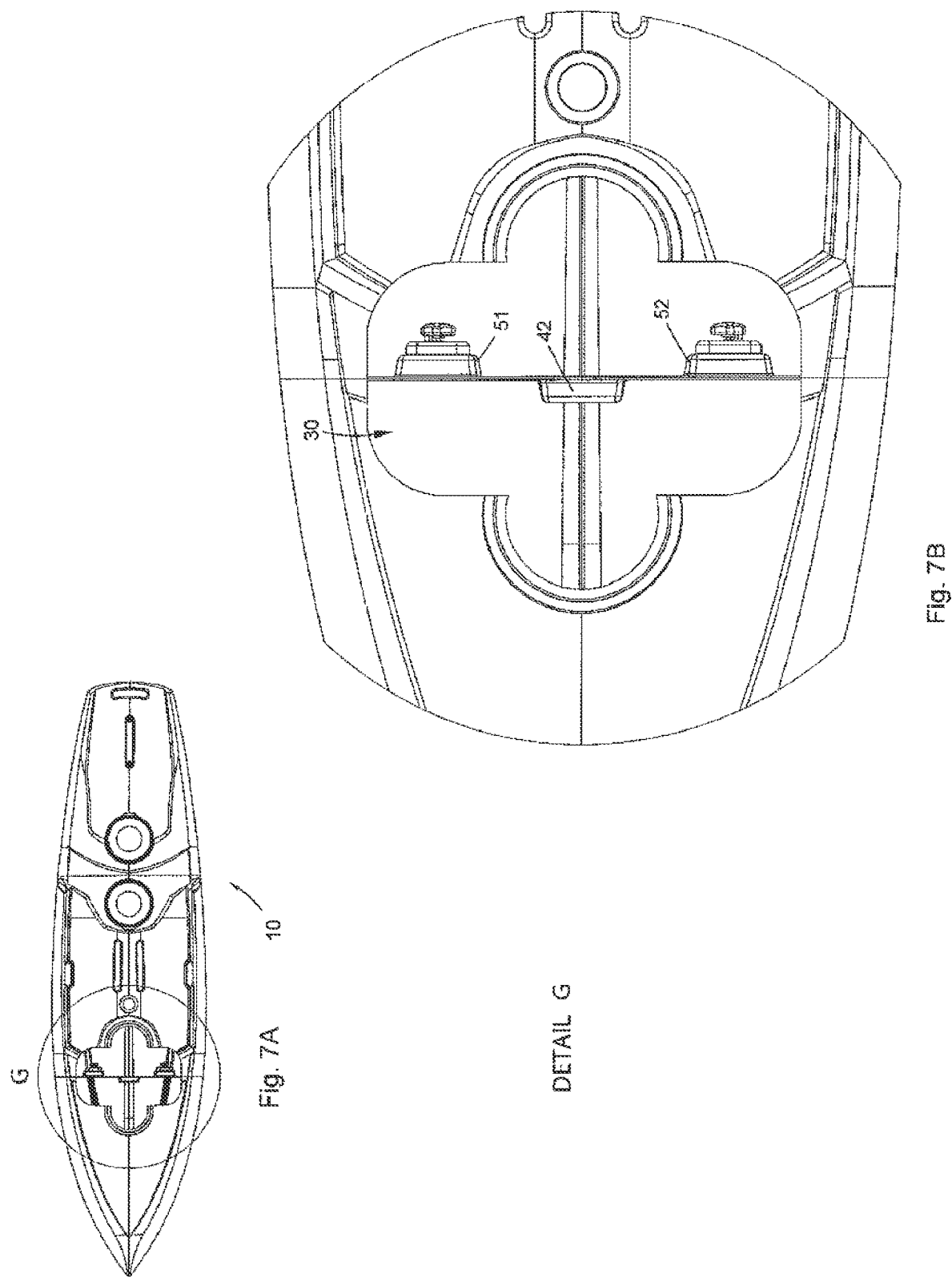

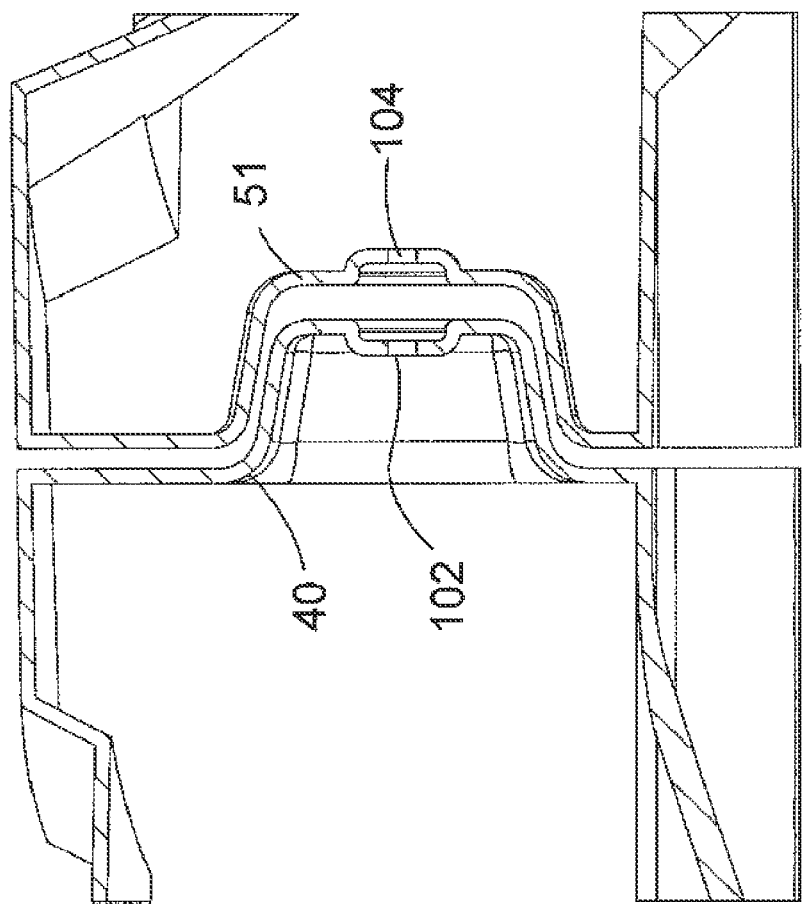

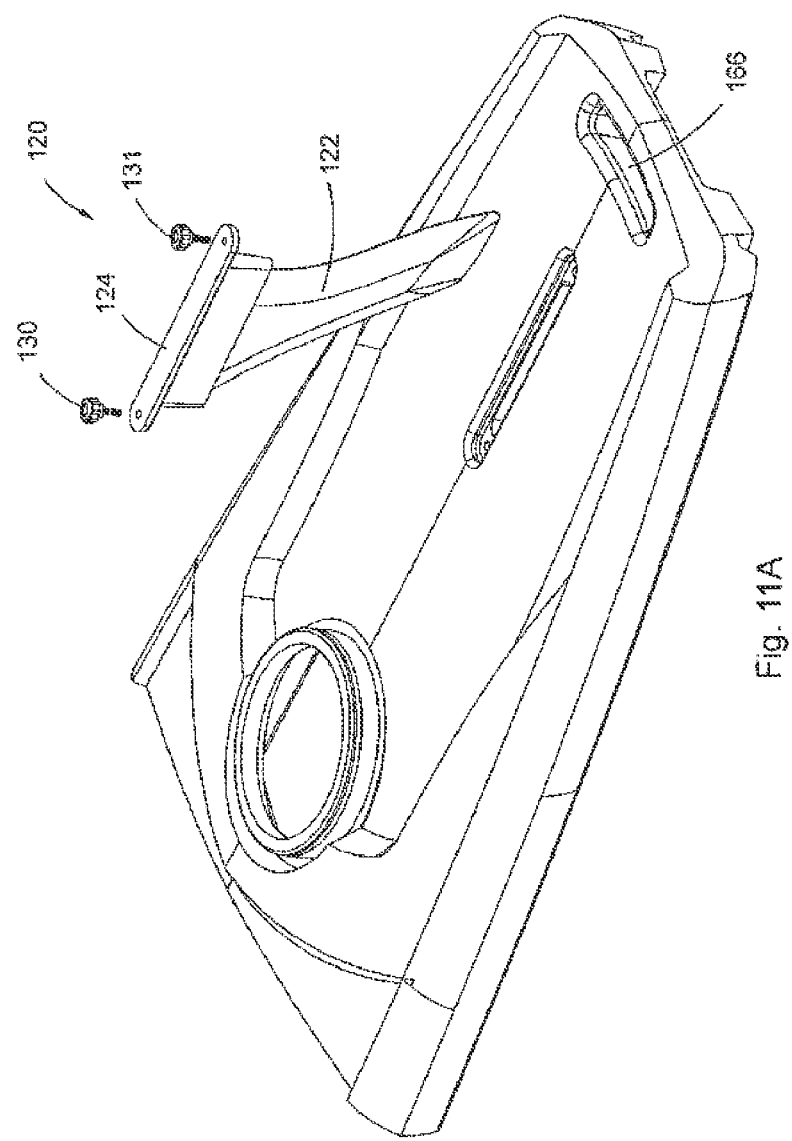

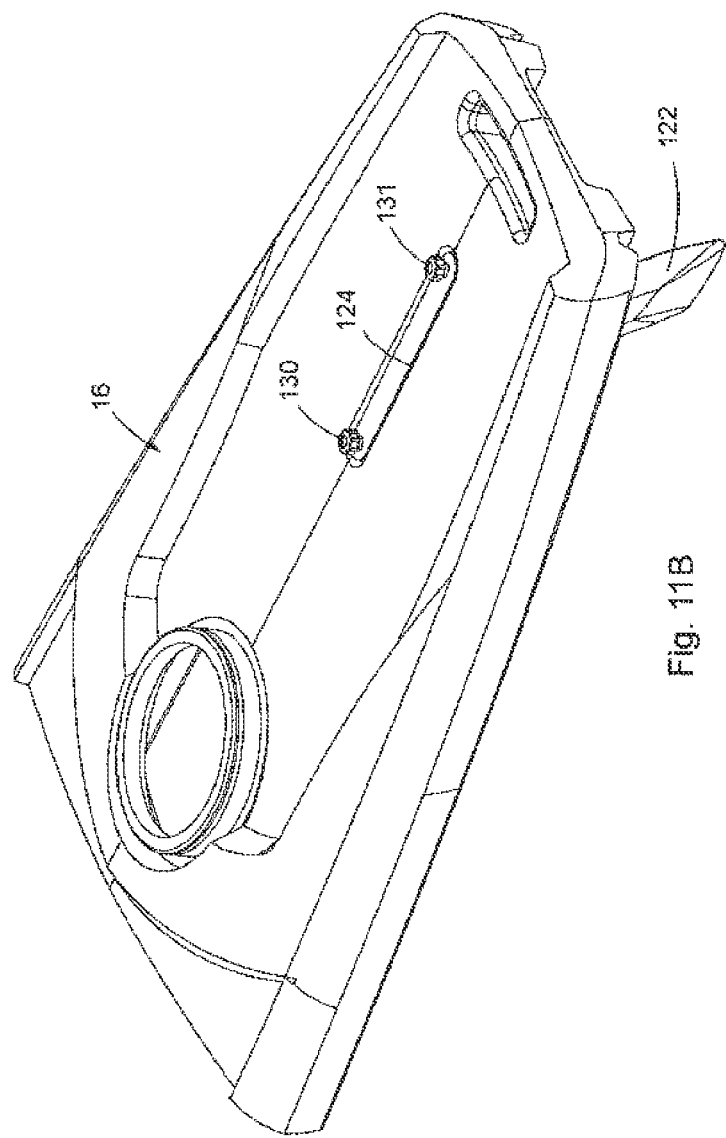

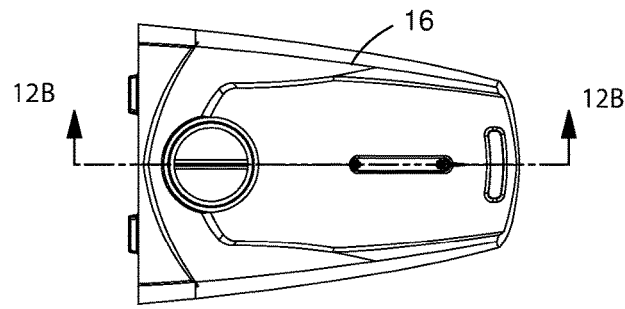
Fig. 12A
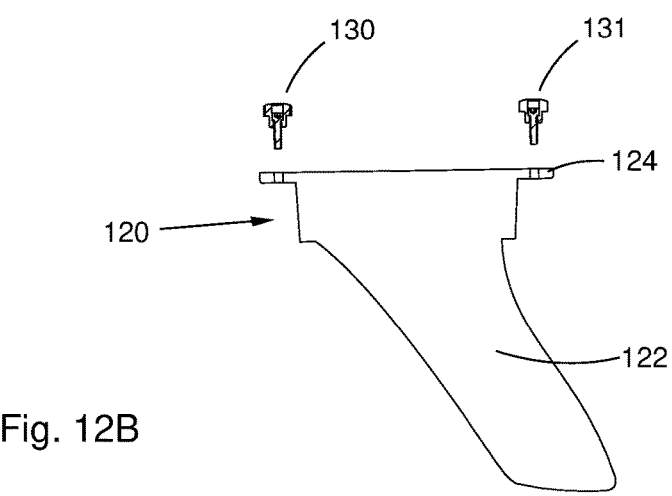
Fig. 12B
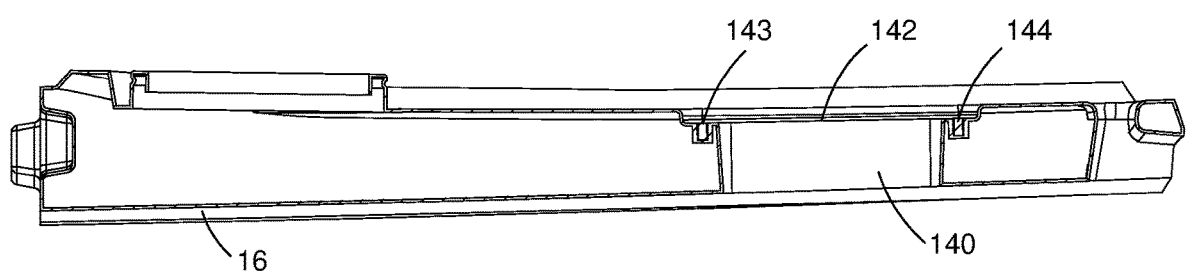

RELEASABLE FASTENING SYSTEM AND ARTICLES USING SAME

CROSS-REFERENCE TO RELATED APPLICATION

This application claims priority of Provisional Application 63/040,217, filed on Jun. 17, 2020, the entire disclosure of which is incorporated herein by reference for all purposes.

BACKGROUND

This disclosure relates to articles with at least two separable portions that are releasably fastened together.

Larger articles, such as watercraft, can be difficult to handle, transport, and store due to their size. If they are made of multiple separate portions, the portions need to be rigidly but releasably fastened together.

SUMMARY

Aspects and examples are directed to a releasable fastening system for articles that include two or more separate, or separable, portions that are configured to be securely fastened together to assemble the completed article. This allows for the reduction of transportation, handling, and storage cost for the articles, while providing an assembled article that functions identically to articles made in one piece.

This disclosure also relates to a releasable fastening system for articles or objects, including but not limited to modular hollow objects, that are made from two or more separate parts that are configured to be securely fastened together to assemble the completed article. This allows the reduction of transportation, handling, and storage costs, while providing an assembled object that has functions identical to objects made in one piece.

One application of this disclosure refers to watercraft (e.g., stand-up-paddleboards (SUPs), canoes, kayaks and modular boats). Such watercraft are typically long, and difficult to ship, transport, store, and handle. In the invention such watercraft are made in two or more smaller, separate portions or modules. In some examples the modules are hollow and the locking mechanisms can be accessed by the user through access into the interiors of the modules. The multiple separate portions are constructed and arranged such that they can be assembled quickly at the time and location of use, forming a rigid unit suitable for navigation. A modular craft can be stored in relatively small spaces, can be transported inside vehicles without roof racks, and can be shipped in relatively smaller boxes.

In some examples the articles of this disclosure and the fastening system are based on connecting any two (or more) parts (modules) by fastening them from the inside. This avoids hardware or fasteners placed on the outside that could easily malfunction or produce injuries. This applies as well to objects other than watercraft. Objects that are relatively long and/or large, and that need to be relatively stiff, can be assembled using the modular design and fastening aspects of the present system. Non-limiting examples of other objects include tables, working surfaces, coolers, and jersey barriers, to name only a few.

Each module has any necessary or desired external surface shape that forms part of the overall contour of an assembled object. Each module has at least one external wall that is configured to mate with an external wall of an adjoining or abutting module. Abutting modules are fastened together using fastening mechanisms that in some examples are located inside of the modules, and that are used to couple the adjoining walls of the modules. In some examples the fastening mechanisms are manipulated through openings in the modules. The openings can be selectively closed, if desirable. In watercraft the openings can be made watertight by the inclusion of covers for the openings that are coupled to the module in a watertight manner.

In an example the interconnection of the modules is accomplished in abutting walls of the modules. In an example the interconnection is made through matching vertical (or otherwise designed) abutting matching walls. When the objects are manufactured with plastic materials that have inherent flexible qualities, to increase the rigidity of such matching walls one or more symmetrical mating protrusions and protrusion-receiving cavities can be included in the abutting walls. The protrusions and cavities can be shaped like truncated pyramids, or any other geometrical shape, dimensioned in such a way to fit tightly into one another once the locking mechanism is engaged. All protrusions can be designed to have a slightly shorter depth than the matching cavity, so that there is room for a sealing gasket between the protrusion and mating cavity. This also allows the walls to flex slightly to maximize the compression force, which further stiffens the joint. The gasket can be made of rubber or EPDM, for example. If needed, a gasket is placed between each protrusion and cavity, to prevent water infiltration into the module interior.

In an example the fastening mechanisms include two stiff plates which are fastened with screws, or other semi-permanent or permanent method, to the inside wall of each mating abutting wall. The plates can be manufactured of nylon, other rigid plastic, or metal, to transfer the compressing action to the mating abutting wall (e.g., the end surface of the protrusions and cavities). In some examples one plate is configured to carry a threaded fastener and the other plate is configured to carry or to define a mating receiving threaded insert or cavity for the threaded fastener. Connection of two modules can then be made by turning the threaded fastener until it is fully received in the threaded cavity. In another example the fastening mechanism is a push-to-lock device.

In an example the receiving plate is positioned inside of the end of the protruding part and has a threaded insert, while the fastener plate is positioned inside the end of the cavity part. In an example a spring-loaded knob attached to a threaded metal stem is used for the threaded fastener. The two plates are symmetrically positioned to match an existing passing hole in the center of the surfaces on which they are mounted. The gasket is positioned, and semi-permanently attached, to the outside wall of the protrusion and includes an opening to pass the threaded fastener. The tightening action (push-and-turn of the knob) will compress the plates against one another, forcing the protrusion/cavity and the vertical walls to come together, to create a strong and rigid double wall structure at the intersections of two adjoining modules. The 90-degree corners formed by the meeting points of the body of the modules and their vertical wall augment the joint stiffness. In an example there are at least two (or more) protrusion-cavity structures in the walls of each module. In an example there can also be one or more additional sets of protrusions/cavities that do not include the fastening/connecting system, to further stiffen the joint.

In another example the releasable fastening mechanism is a push-to-lock device. The device can have a locking pin that can move within a locking sleeve. A pair of balls have alternate positions wherein one position they lock the pin to the sleeve and in another position they lock the sleeve to a receiving side of the mechanism. This allows the pin to be moved in and out of the receiving side and lock the sleeve to the receiving side. A cam handle can then be used to pull the two sides together, so that the joint between the two is stiffened. Gaskets between the two modules can be used to seal from water ingress. In some examples the two mating sides are flat. Compliant sealing structures such as gaskets can be located at and around the locking mechanisms, to inhibit the ingress of water through the parts of the locking mechanisms.

The assembled structure (e.g., the top surface of a SUP, which needs to support a person standing in the middle of the board) can be further stiffened by the addition of top to bottom passing holes with vertical walls that help to stiffen the structure, and/or top surface features that provide stiffening elements to the otherwise flat surface. The bottom can be stiffened in the same way.

All examples and features mentioned below can be combined in any technically possible way.

In one aspect, an article includes at least two partially or fully separable portions that are configured to be securely fastened together to assemble the completed article and a plurality of releasable fastening mechanisms, each fastening mechanism located in part in each of two adjoining portions that are configured to be joined together.

Some examples include one of the above and/or below features, or any combination thereof. In an example the article further comprises a plurality of mating protrusions/receiving cavities on mating external walls of two adjoining portions. In an example at least one of the mating protrusions/receiving cavities comprises a releasable fastening mechanism. In an example a releasable fastening mechanism comprises a threaded member in one portion and a receiving threaded cavity in the other portion.

Some examples include one of the above and/or below features, or any combination thereof. In some examples the article comprises a watercraft. In an example the watercraft comprises a stand-up paddleboard (SUP). In an example the SUP comprises a removable fin that is configured to be removably locked in a depression in a top surface of the SUP. In an example the watercraft comprises a canoe or kayak. In an example the article comprises a cooler.

Some examples include one of the above and/or below features, or any combination thereof. In some examples a releasable fastening mechanism comprises a push-to-lock device. In an example the push-to-lock device comprises a movable locking pin that defines at least one cavity that is configured to receive a locking ball. In an example in an unlocked position the locking pin is located in only a first of first and second adjacent portions of the article and in a locked position the locking pin is located in both the first and second portions. In an example the second portion comprises a ball-receiving shoulder.

Some examples include one of the above and/or below features, or any combination thereof. In some examples mating surfaces of the portions are flat. In an example the fastening mechanisms pass through both flat mating surfaces. In an example the article further comprises compliant sealing members around the fastening mechanisms, to inhibit water ingress.

In another example a stand-up paddleboard (SUP) includes a plurality of fully separable portions that are configured to be securely fastened together to assemble the SUP, wherein each portion defines a flat surface at an end where it is configured to be mated to and coupled to another portion. There are a plurality of releasable fastening mechanisms, each fastening mechanism located in part in each of two adjoining portions that are configured to be joined together and passing through both flat mating surfaces to be coupled together by the locking mechanisms. Each locking mechanism comprises a push-to-lock device with a movable locking pin that defines at least one cavity that is configured to receive a locking ball, wherein in an unlocked position the locking pin is located in only a first of first and second mating portions of the article and in a locked position the locking pin is located in both the first and second portions.

Some examples include one of the above and/or below features, or any combination thereof. In an example the second portion comprises a ball-receiving shoulder. In an example there are two or more locking balls.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures:

FIG. 1A is a top assembled view of a SUP, while FIG. 1B is a view before assembly.

FIG. 2A is a perspective assembled view of a SUP, while FIG. 2B is a view before assembly.

FIG. 3A is similar to FIG. 1B, and FIG. 3B illustrates detail B of FIG. 3A.

FIG. 5A is a cross-sectional view through one pair of mating protrusions/cavities, before assembly, while

FIG. 6A is a perspective exploded view of the connection hardware, while

FIG. 7A is a top view similar to that of FIG. 4, and FIG. 7B illustrates detail G of FIG. 7A.

FIG. 8C is like FIG. 8B but before the adjoining portions are pulled together by the hardware.

FIG. 11A is a top exploded perspective view of the stern portion and FIG. 11B is an assembled view thereof.

FIGS. 12A and 12B are like FIGS. 10A and 10B, except FIG. 12B is an exploded cross-sectional view taken along line 12B-12B, FIG. 12A.

DETAILED DESCRIPTION

Figure 4:
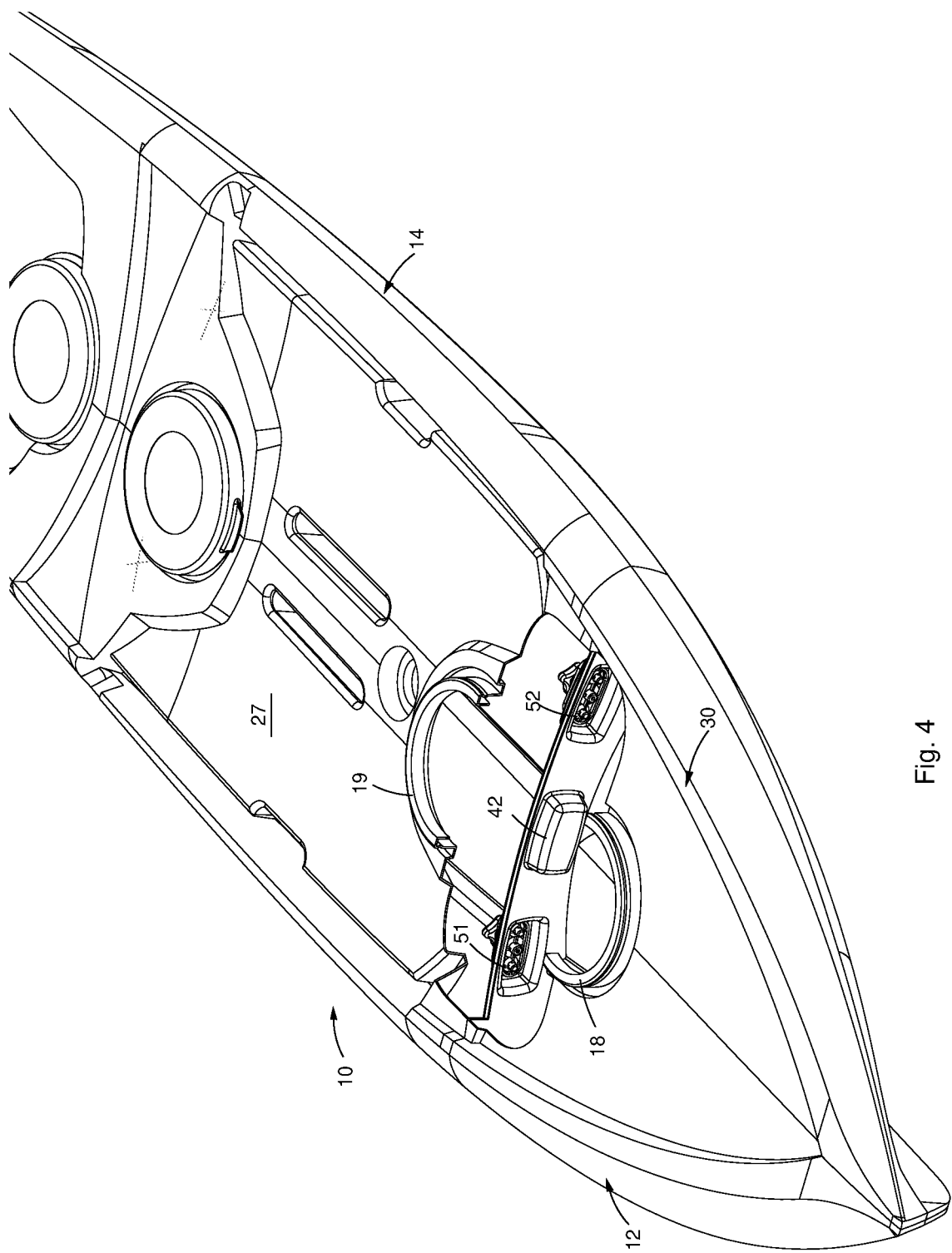
FIG. 4 is a partially broken-away view illustrating a joint.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIGS. 1-12 of the drawings detail an example of the invention applied to a SUP. Following (Table 1) is a list of part numbers in FIGS. 1-12.

TABLE 1

| | |
|---|---|
| 10 | stand-up paddleboard |
| 12 | front (bow) portion |
| 14 | middle portion |
| 16 | rear (stern) portion |
| 18-21 | reclosable sealing covers (hatches) |
| 15, 17 | side rails |
| 30 | Portion connecting assembly |

TABLE 1-continued

| | |
|---|---|
| 161, 162, 163, 164, 165, 167, 168 | Scuppers |
| 23, 25 | Raised surface features |
| 40, 41 | Fastening protrusions |
| 42 | Stiffening (non-fastening) protrusions |
| 50 | Receiving cavities for protrusions 42 |
| 51, 52 | Receiving cavities for fastening protrusions 40 and 41 |
| 27 | Central flat area for user to stand on |
| 61, 71 | Plates |
| 62, 63, 72, 73 | Screws to fasten plates inside of protrusions and cavities |
| 67 | Threaded fastener |
| 66 | Knob for fastener |
| 76 | Threaded insert, for receiving the threaded fastener |
| 80 | Protrusion/cavity assembly |
| 68 | Gasket |
| 102, 104 | Vertical interior walls |
| 90 | Connection hardware for a mating protrusion and cavity |
| 91 | Spring |
| 74, 92 | O-rings |
| 77 | O-ring |
| 105 | Wall openings that accept threaded fastener |
| 120 | Detachable stabilizing fin assembly |
| 122 | Stabilizing fin |
| 124 | Top flange of fin assembly |
| 130, 131 | Threaded knobs to hold fin to the stern portion |
| 140 | Fin-receiving cavity |
| 142 | Receiving cavity for flange 124 |
| 143, 144 | Threaded inserts to receive threaded fasteners 130, 131 |
| 166 | Rear handle scupper |

Each of the three portions 12, 14, 16 of SUP 10 are hollow and are preferably fabricated by rotational molding using an appropriate plastic material. SUP includes several scuppers 161, 162, 163, 164, 165, 167, and 168. Raised surface features 23 and 25 help to provide grip for the user's feet. Central flat area 27 is provided for the user to stand on.

Figure 5B:
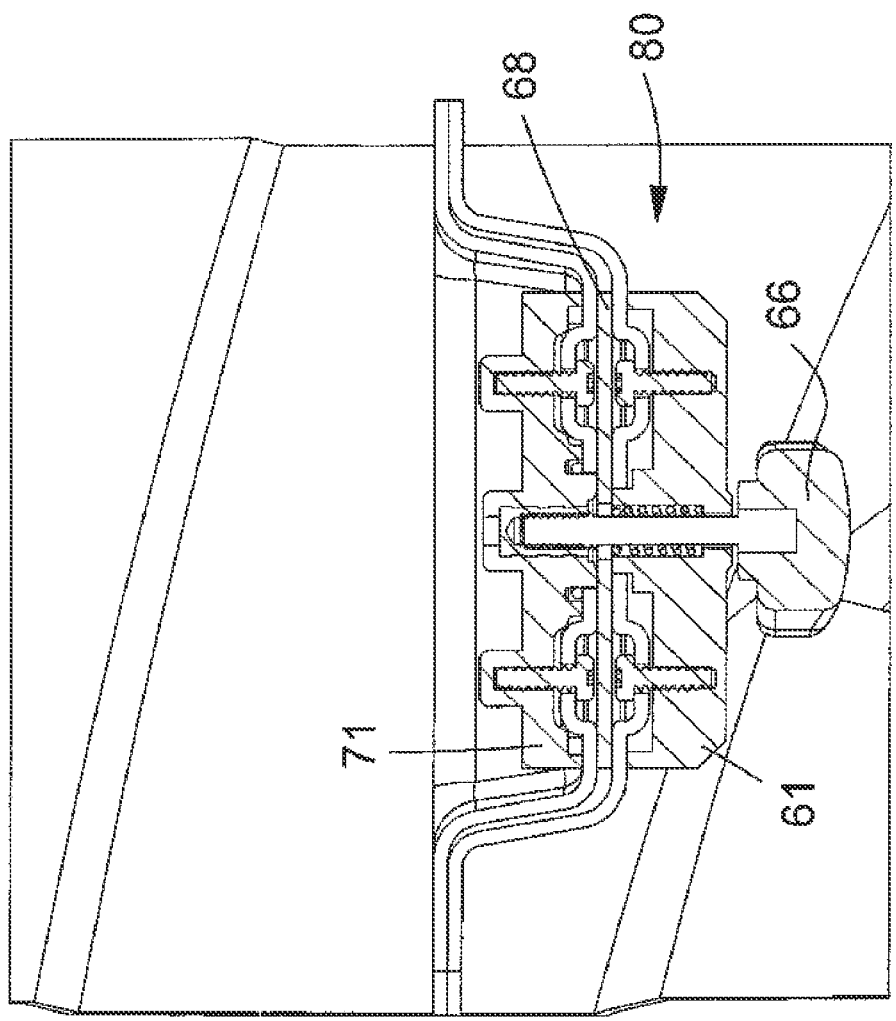
FIG. 5B illustrates them after assembly and FIG. 5C is a vertical cross-section.
Figure 5C:
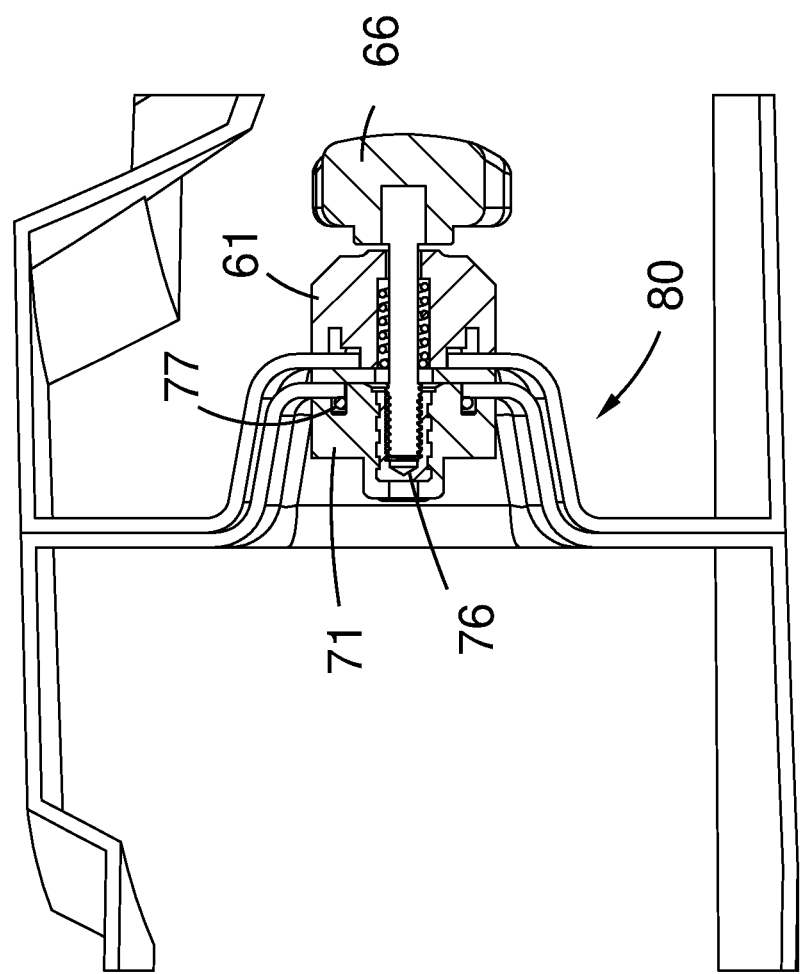
Figure 6B:
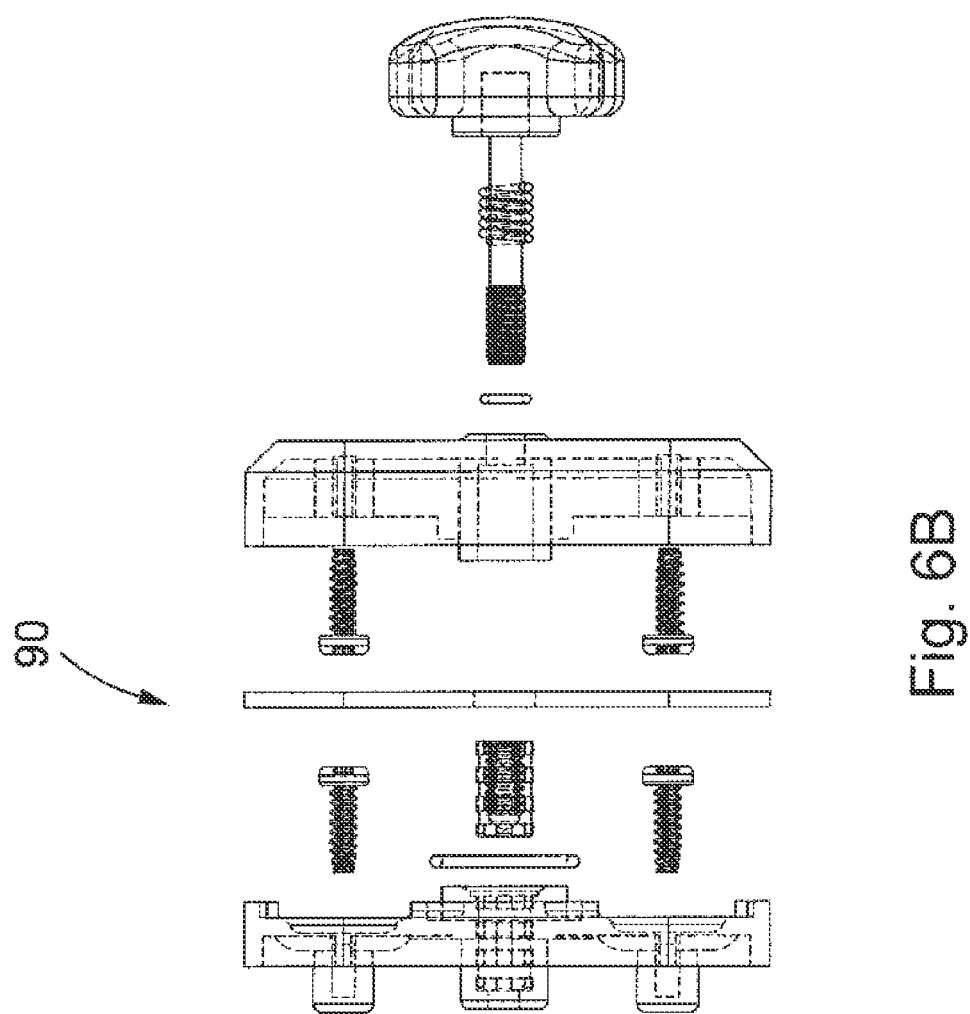
FIG. 6B is a side view thereof.
Figure 8B:
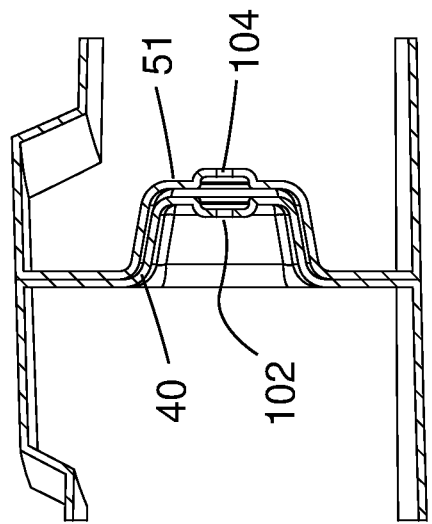
FIG. 8A illustrates a protrusion without hardware and FIG. 8B is a cross-section taken along line 8B-8B, FIG. 8A.
Figure 8A:
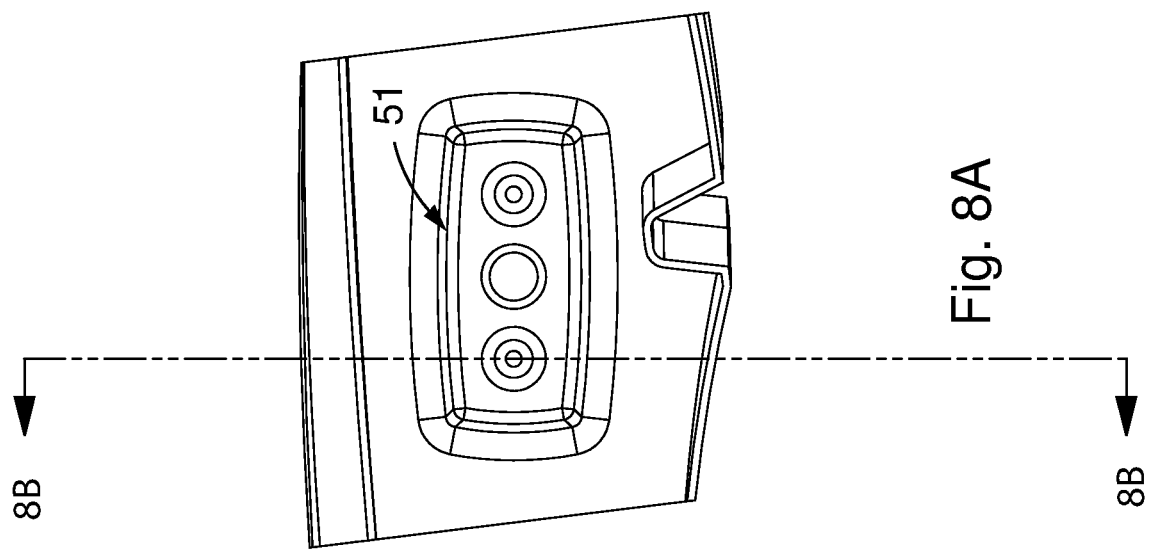
Figure 9B:
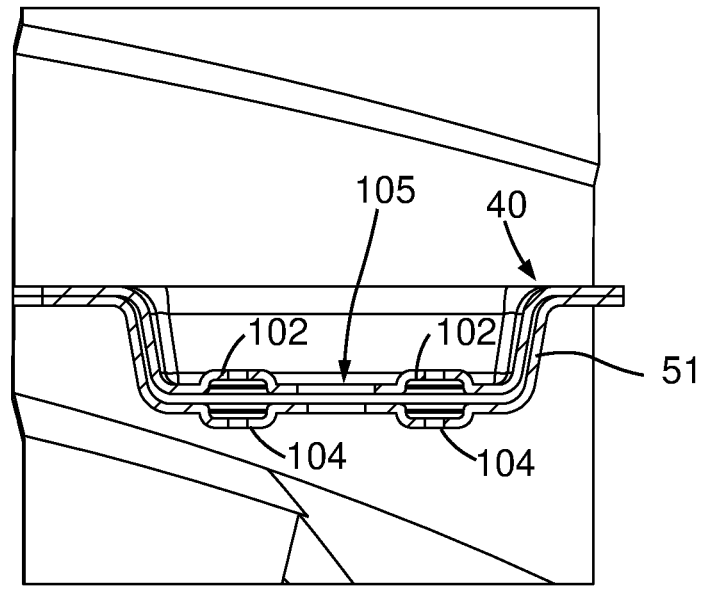
FIG. 9A illustrates a protrusion without hardware and FIG. 9B is a cross-section taken along line 9B-9B, FIG. 9A.
Figure 9A:
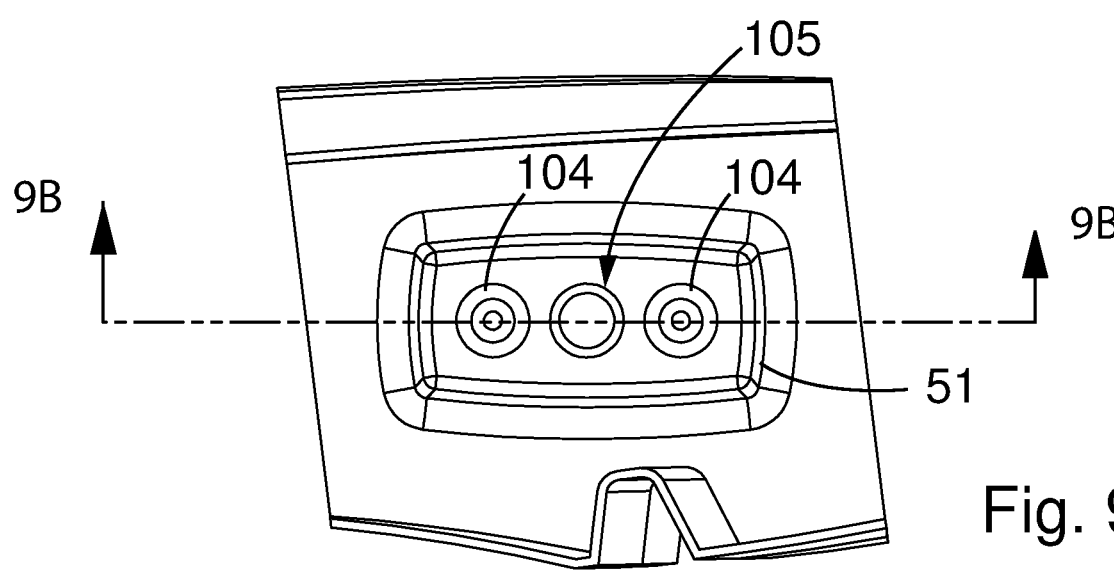
Figure 10A:
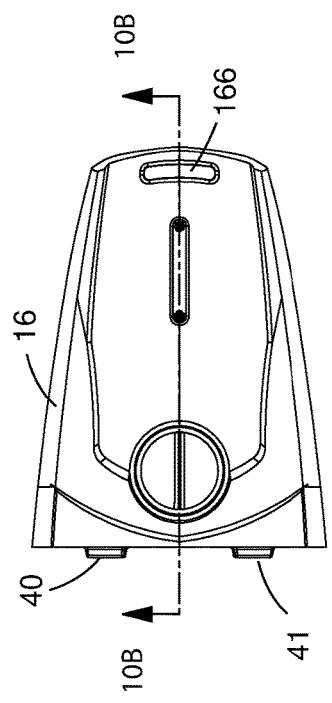
FIG. 10A is a top view of the stern portion.
Figure 10B:
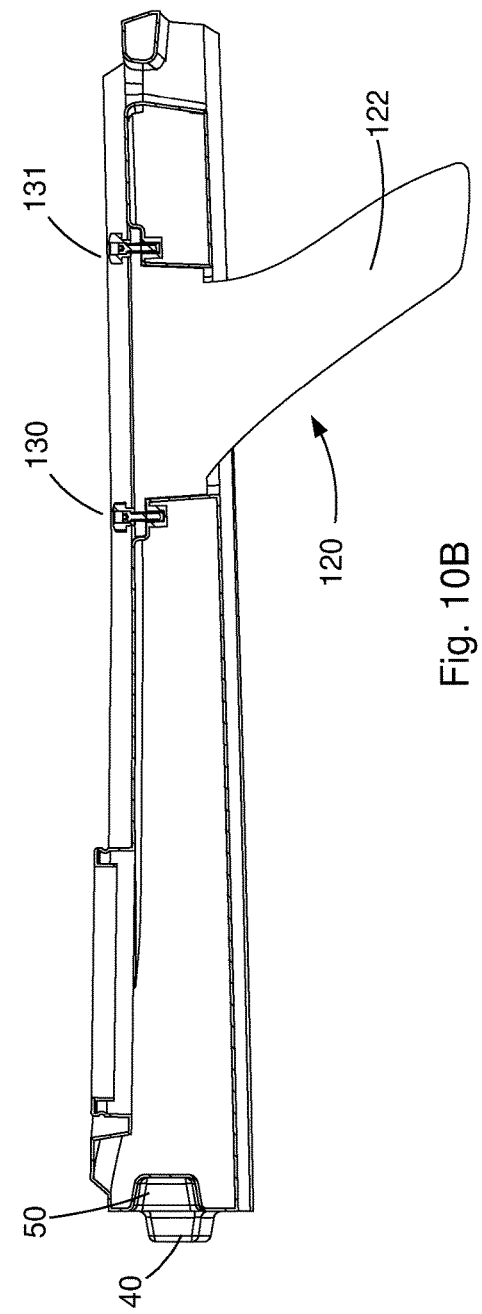
FIG. 10B is a cross-section taken along line 10B-10B, FIG. 10A.

Each portion connecting assembly 30 includes two protrusions 40, 41, that fit into and are fixed to receiving cavities 51 and 52. Each assembly 30 also includes protrusion 42 that fits into but may not be fixed to receiving cavity 50. FIG. 3B illustrates one assembly 30 before the two portions are coupled together. One protrusion/cavity assembly 80 is shown in FIG. 5A (apart), FIG. 5B (coupled together, horizontal cross-section) and FIG. 5C (coupled together, vertical cross-section). Connection hardware 90 is shown in FIGS. 6A and 6B. Each side includes a plate 61 or 71 that is fastened with screws 72 and 73. Threaded fastener 67 is turned in and out of receiving insert 76 via handle 66. Spring 91 assists with removal when the locking mechanism 90 is unlocked. Gasket 68 and O-rings 77 and 92 help to prevent water infiltration into the interior of the SUP. Hatches 18-21 can be removed (e.g., by turning them) so the user can reach in to access handles 66.

Detachable stabilizing fin assembly 120 includes fin 122 that projects from top flange 124. Threaded knobs 130 and 131 are used to removably hold flange 124 to the SUP via threaded inserts 143 and 144 located in the top of rear portion 16.

Figure 13A:
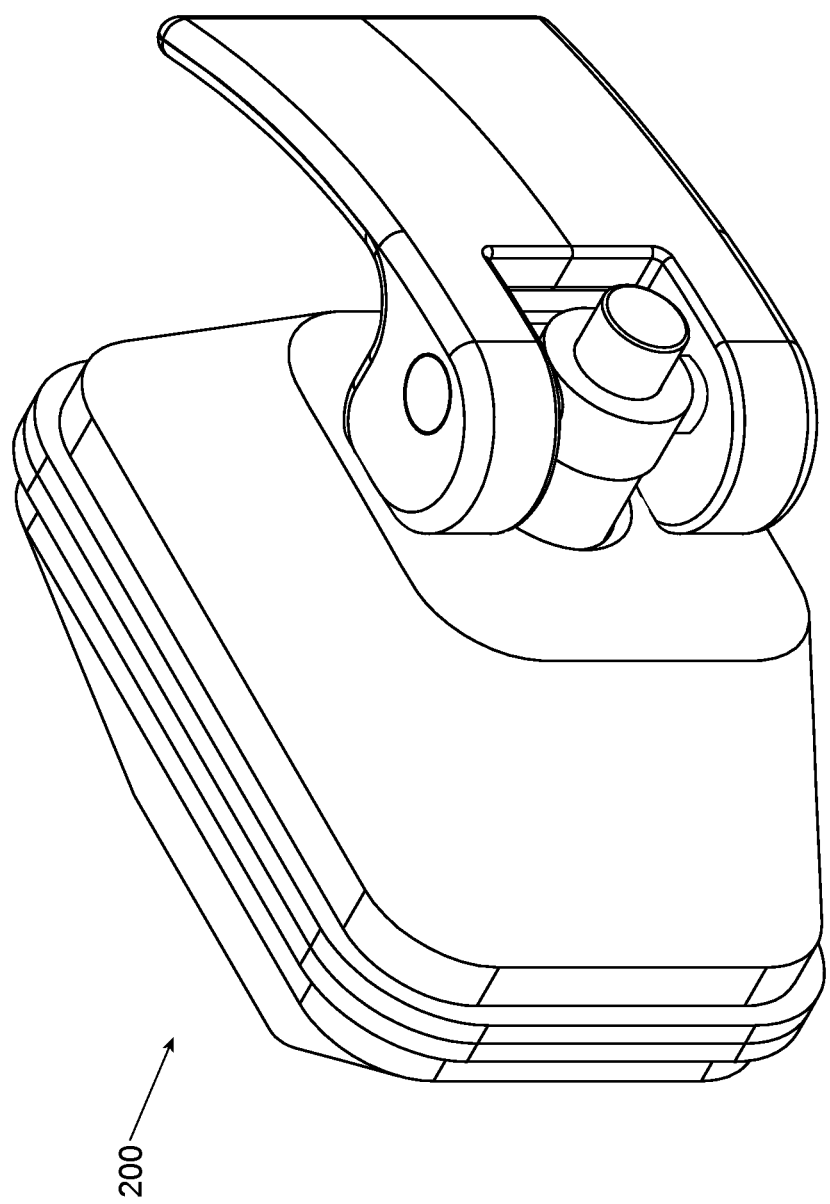
FIG. 13A is a perspective view of a releasable fastening/locking mechanism and FIG. 13B is an exploded view thereof.

Alternative locking mechanism 200, FIGS. 13 and 14, can be used to quickly and tightly compress and hold together two abutting surfaces, for example the surfaces of abutting portions of a SUP as depicted in FIGS. 1-12. Mechanism 200 is a push-to-lock device with a cam action that completes the compression of the abutting surfaces of the two mating portions. One side 201 (the actuation side) is held in one portion and the other side 203 (the receiving side) is held in the other portion. Actuation side 210 includes locking pin 206 that is configured to be moved into and out of receiving side 203, and can move relative to overlying locking sleeve 222. Pin 206 includes receiving depressions or cavities 225 and 227 that are configured to receive locking balls 224 and 226.

Figure 13B:
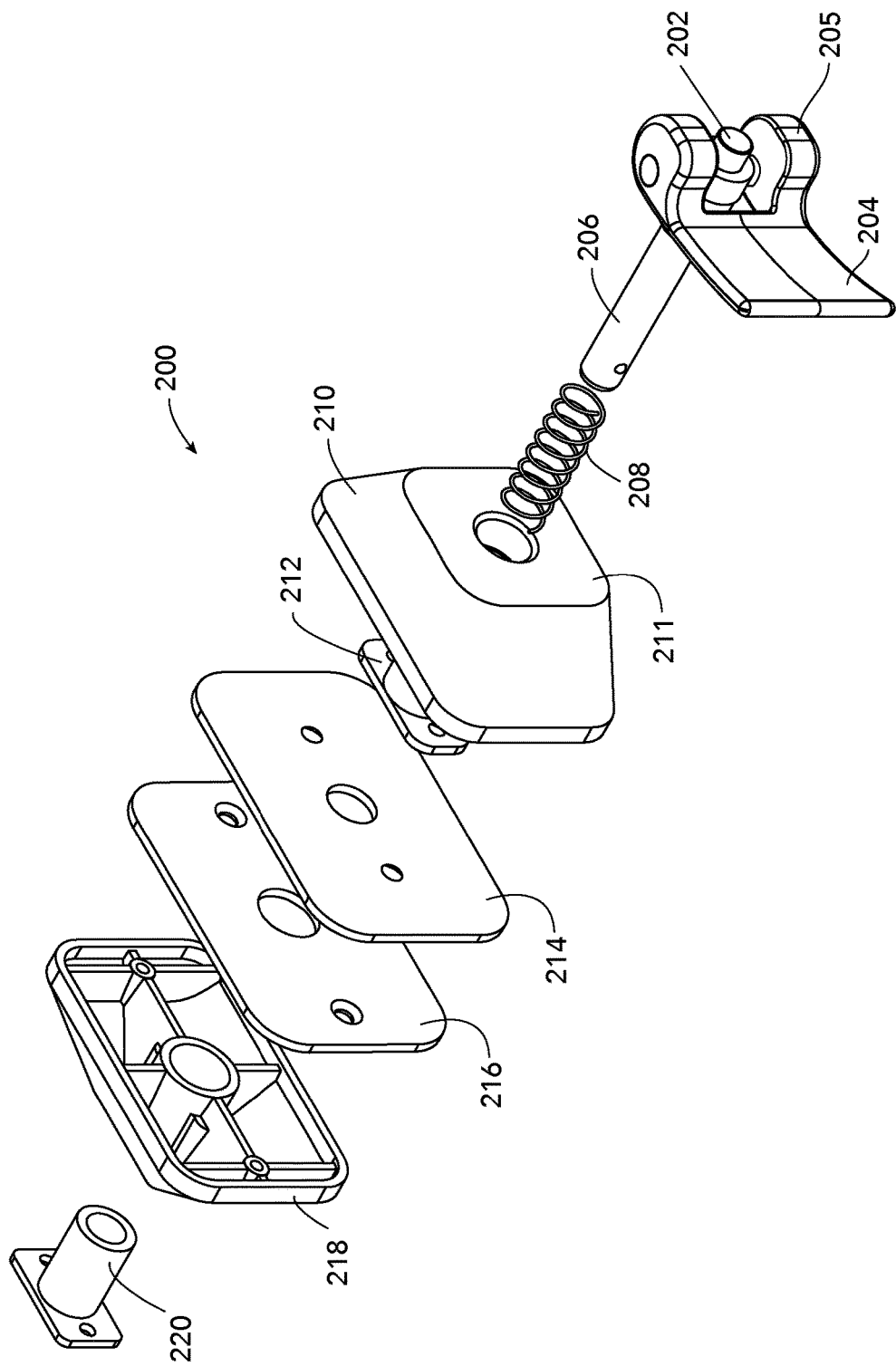

Many of the parts of mechanism 200 are shown in FIG. 13B. Actuation side 201 includes module wall 214 to which is fixed force distribution structure 210 (e.g., with screws), with collar 212 between the two, screwed to structure 210. Pin return spring 208 fits over pin 206. Cam handle 204 has cam surface 205. Button 202 is used to move the pin along its longitudinal axis. Receiving side 203 also includes module wall 216 to which is fixed force distribution structure 218. Receiving collar 220 is screwed to structure 218. Not shown are seals or gaskets (e.g., rubber or EPDM) that are between walls 214 and 216 of the modules being joined, and that are compressed in order to inhibit the ingress of water into the modules through the openings for the locking mechanism and screws.

Figure 14A:
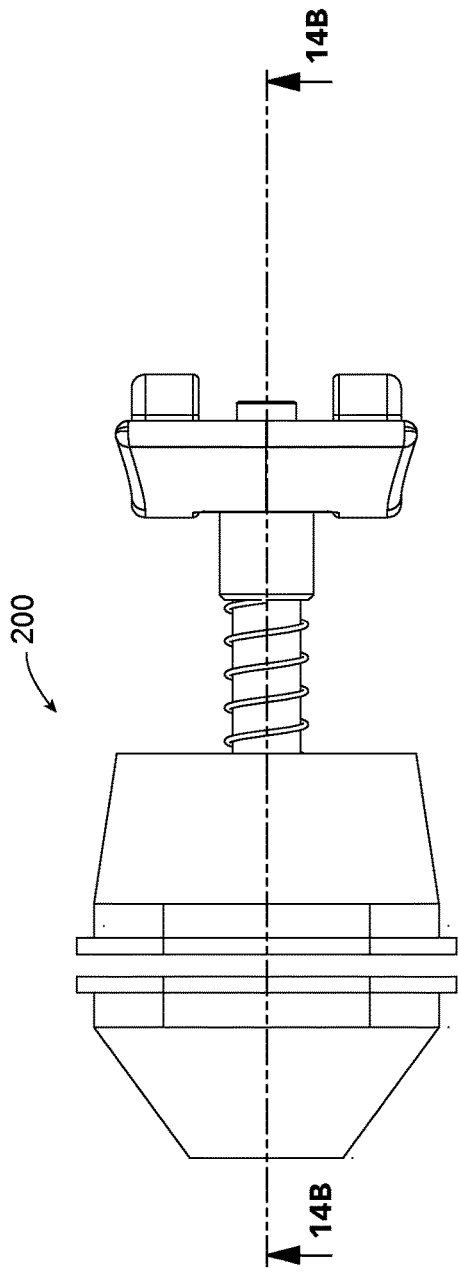
FIG. 14A is a side view of a releasable fastening/locking mechanism.
Figure 14B:
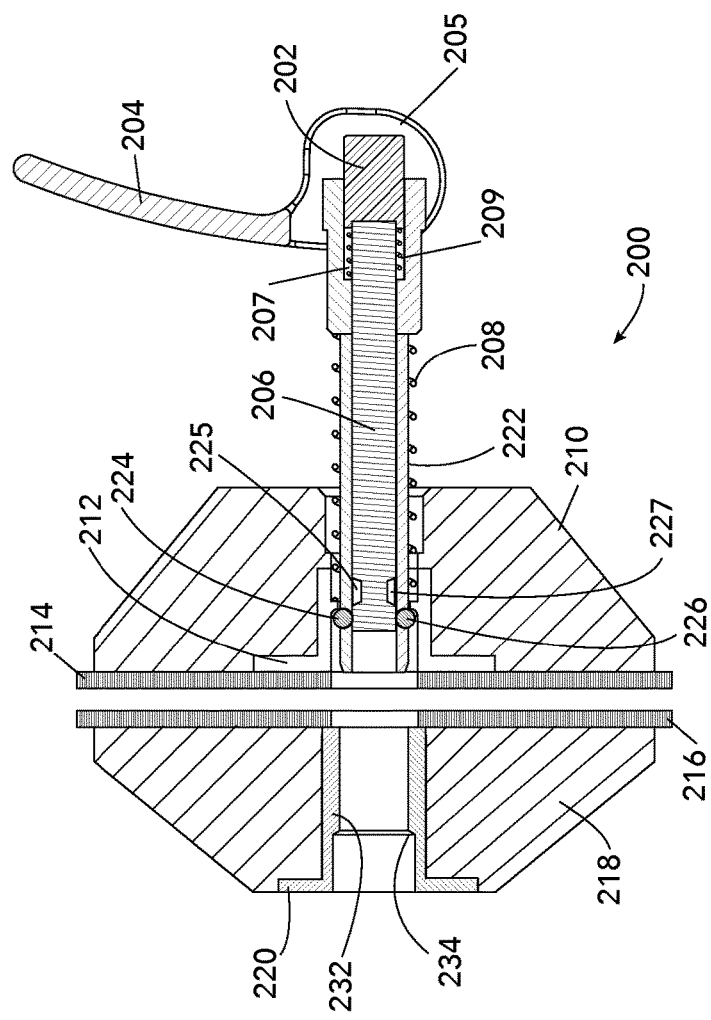
FIG. 14B is a cross-sectional view thereof taken along line 14B-14B with the mechanism in the open position.
Figure 14C:
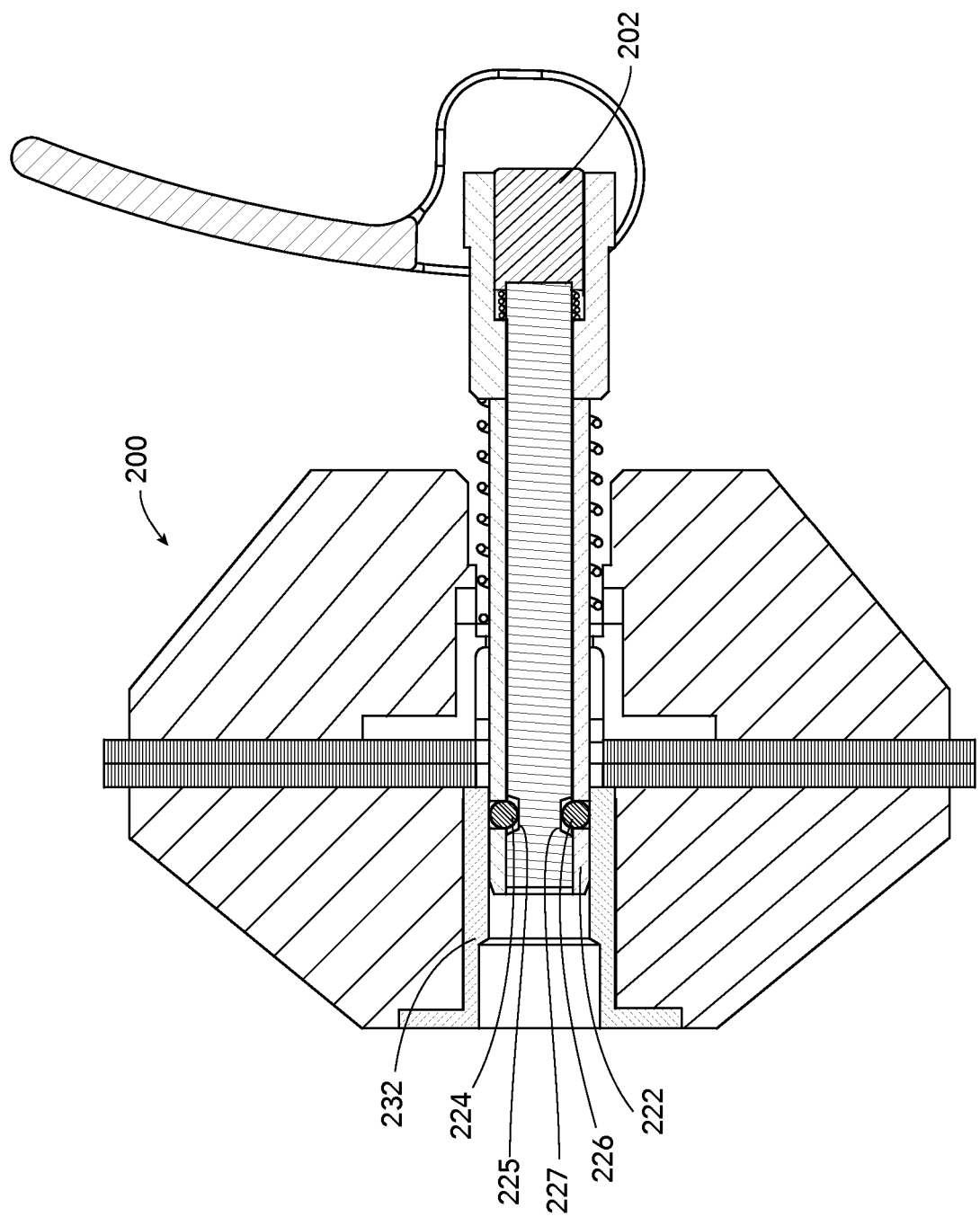
FIGS. 14C-E are additional cross-sections illustrating the mechanism being locked.
Figure 14D:
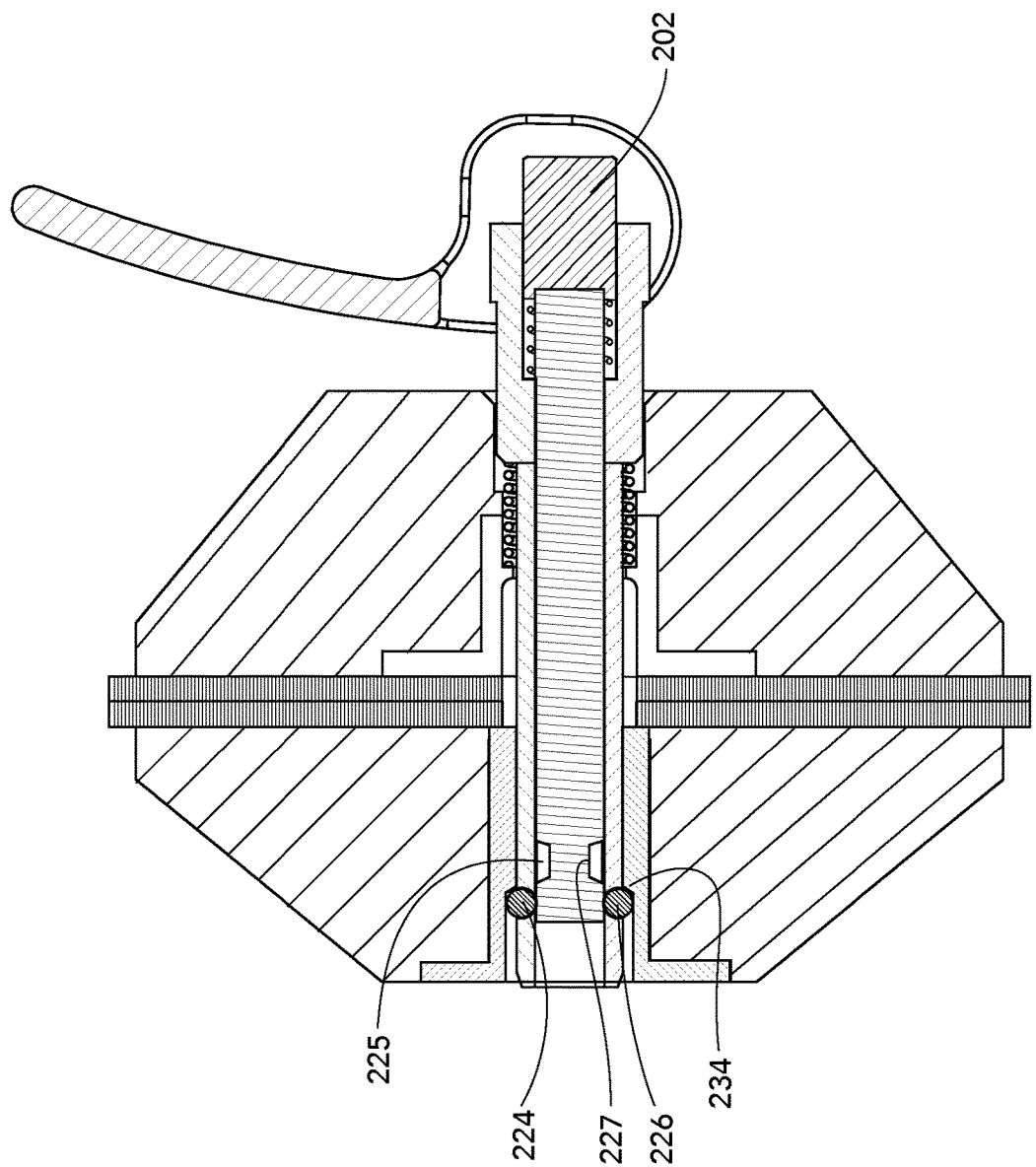
Figure 14E:
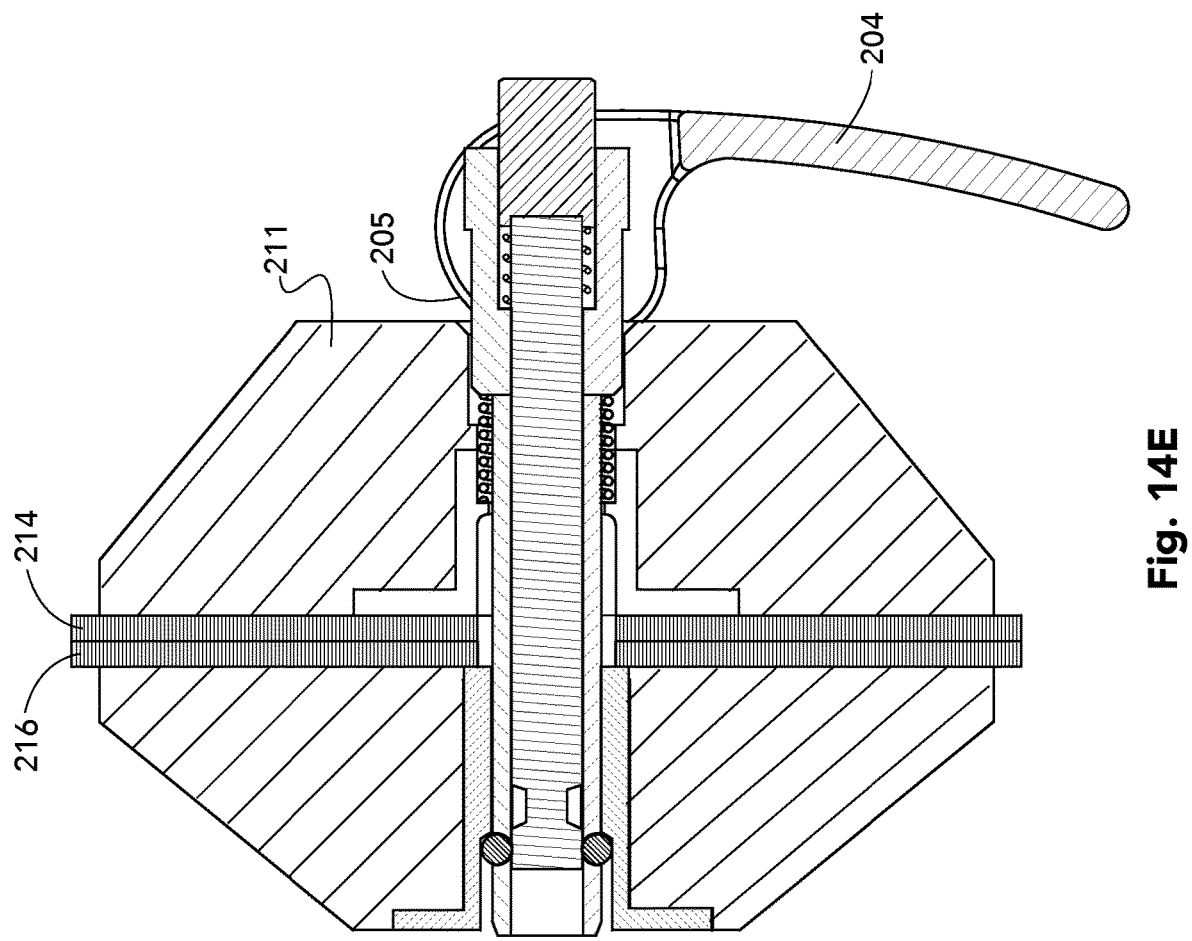

In the unlocked position shown in FIG. 14B balls 224 and 226 sit in openings in sleeve 222. Pin actuation button 202 is in the outward position as determined by spring 207 located in button cavity 209. Button 202 is connected to pin 206. When button 202 is pushed in, pin 206 slides within sleeve 222 until balls 224 and 226 fall into depressions 225 and 227. This locks the pin and sleeve together, and also locates the balls within the inside diameter of bore 232 of receiving collar 220, thus allowing sleeve 222 and pin 206 to move into receiving side 203 as shown in FIG. 14C. As this locking/receiving pin/sleeve motion continues, the balls reach enlarged shoulder region 234 where the balls are pushed out of depressions 225 and 227 and thus lock sleeve 222 to collar 220. Button 202 is then pushed again to pop it out and move pin 206 to the right so that the balls remain in the locking position shown in FIG. 14D. The mechanism is then tightened by pulling handle 204 over such that camming surface 205 presses against outer surface 211 of force distribution structure 210, which further pulls sleeve 222 to the right and tightly pulls together module walls 214 and 216, providing a water-tight surface and part locking action. Pulling the module walls together also helps to stiffen the joint, so that the two modules act as if they are not separate but rather were made as single piece. Unlocking is accomplished in reverse by lifting the cam handle to its non-engaged position, pushing in the button, to move the pin under the balls where they move into the depressions in the pin. Spring 208 then pushes the pin/sleeve out of the receiving side into the unlocked position shown in FIG. 14B.

Figure 15B:
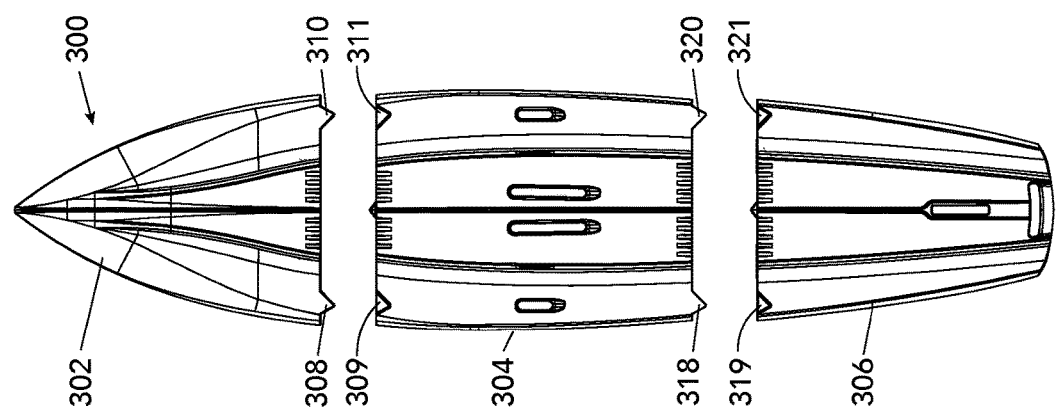
FIG. 15B is a bottom view thereof.
Figure 15A:
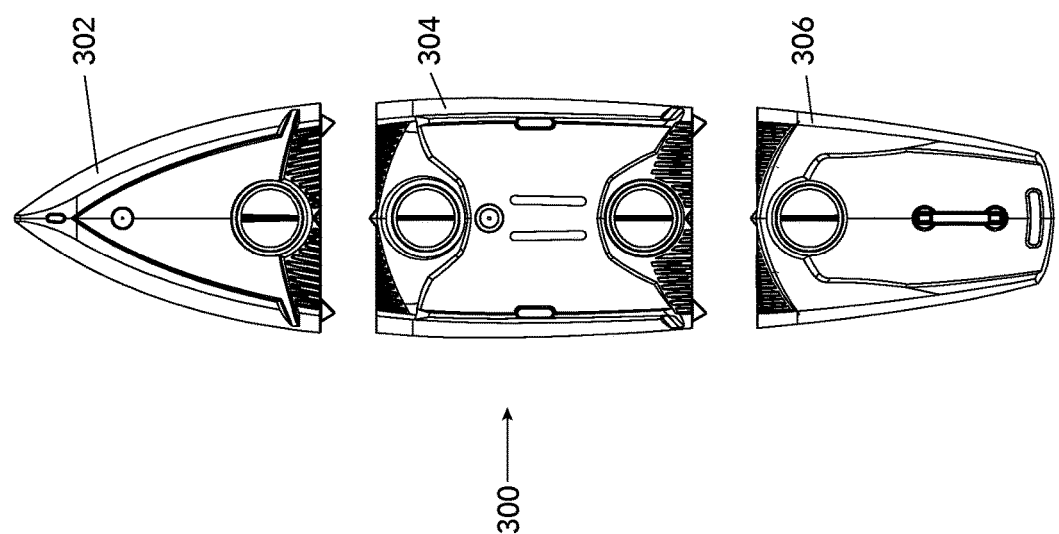
FIG. 15A is a top separated view of another SUP.
Figure 16:
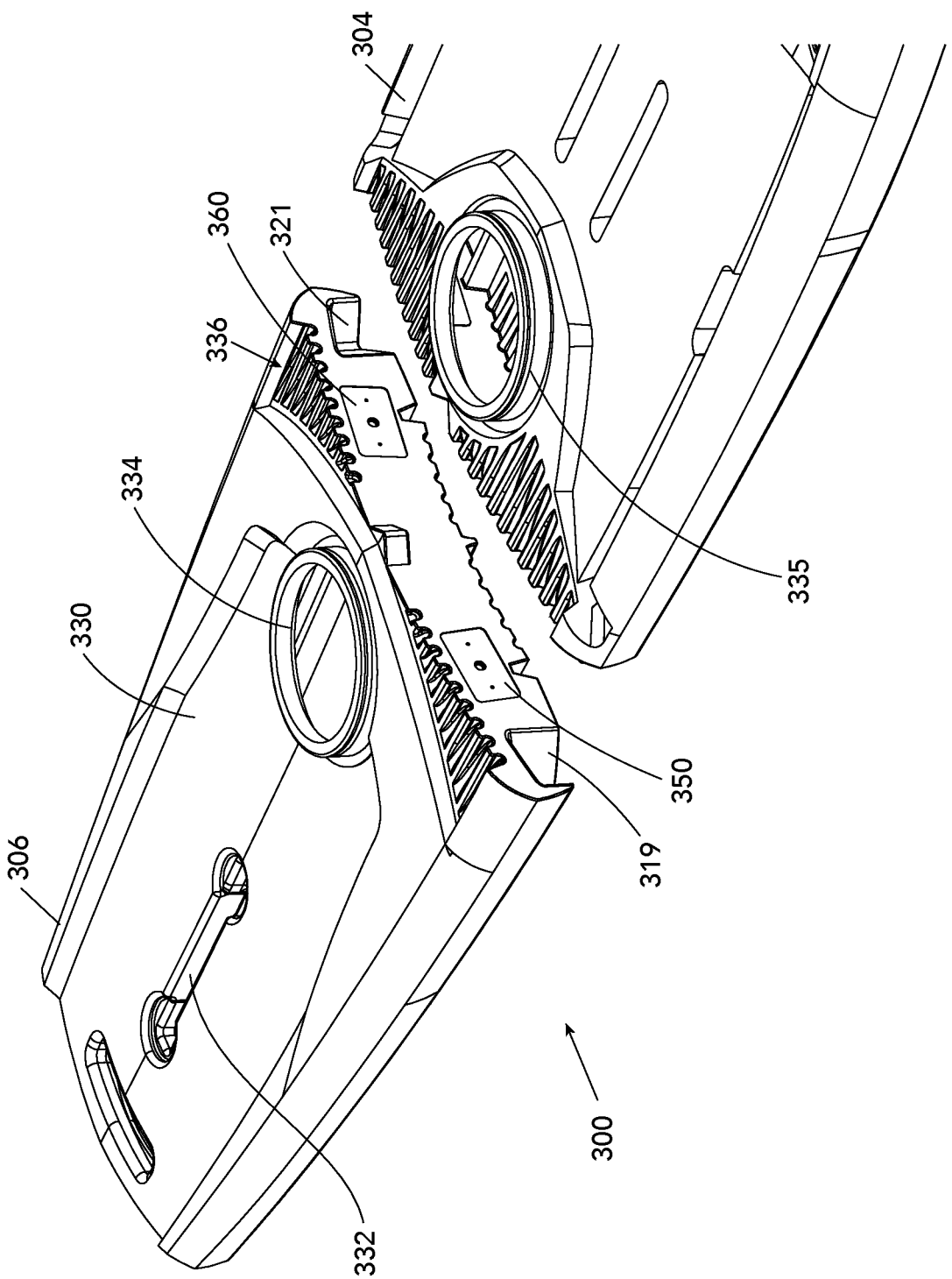
FIG. 16 is a perspective view of two mating parts of the SUP shown in FIGS. 15A and 15B.
Figure 17:
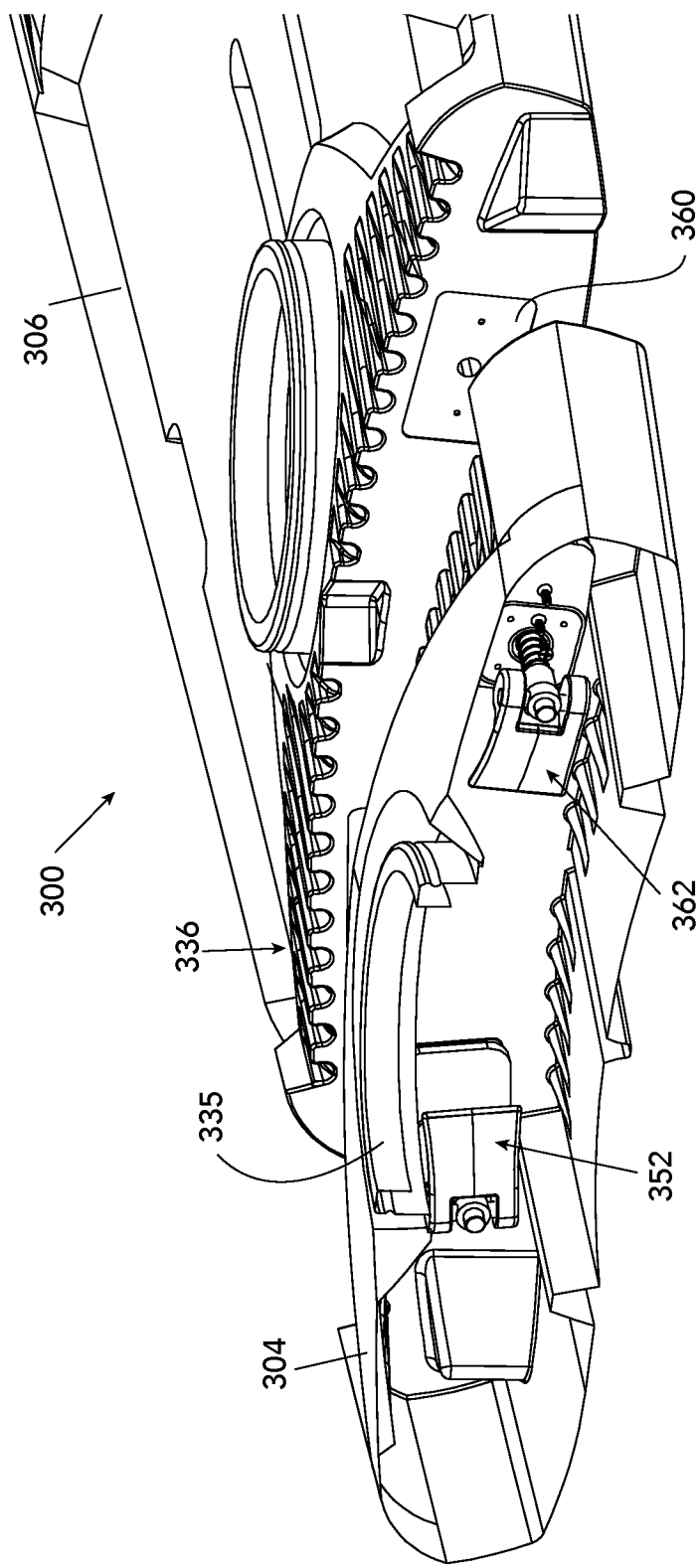
FIG. 17 is a partial sectional view illustrating two locking mechanisms.

Another example of a SUP 300 is shown in FIGS. 15-17. One difference is that it uses the locking mechanisms shown in FIGS. 13 and 14. There are other differences which will be apparent.

SUP is also made from three separable parts or portions, the bow 302, the middle 304, and the stern 306. Surface groove features on the top and bottom proximate both sides of the joints help to stiffen the joints. There are a series of alignment protrusions 308, 310, 318, and 320, that are received in receiving cavities 309, 311, 319, and 321 that are on different parts. These features help to properly align the parts so that the locking mechanisms that lock the three parts together are properly aligned. As before, the locking mechanisms are inside the SUP and are accessed through hatches (e.g., hatches 334 and 335) that are sealed with twist-off covers. Two locking mechanisms are shown in FIGS. 16 and 17. One has locking mechanism actuation side 352 and receiving side 350. The other has actuation side 362 and receiving side 360.

Figure 18A:
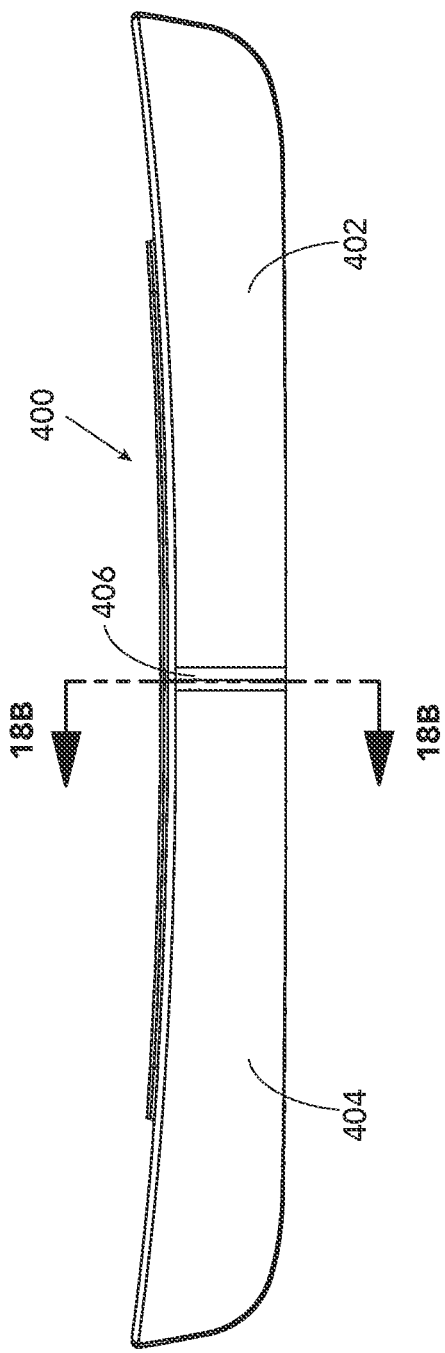
FIG. 18A is a side view of a canoe and FIG. 18B is a cross-sectional view thereof taken along line 18B-18B.
Figure 18B:
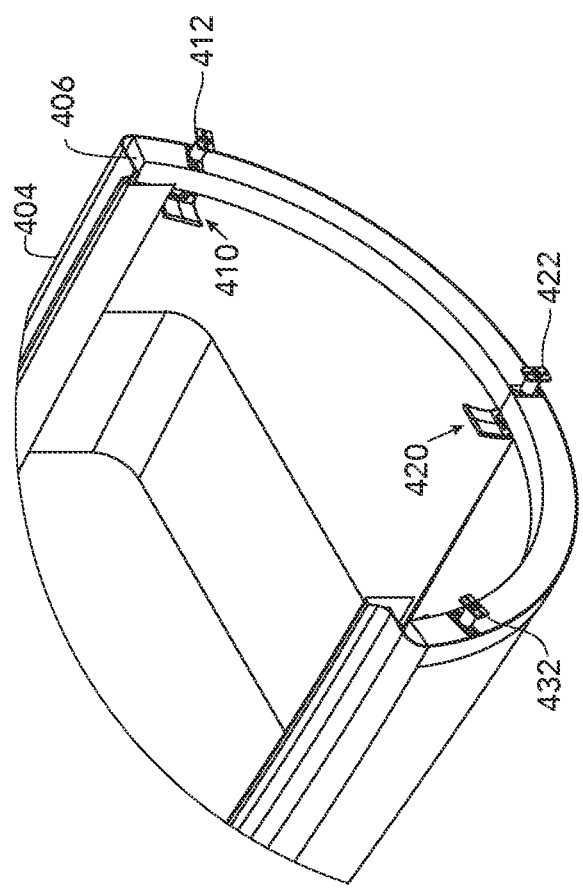

FIGS. 18A and 18B illustrate canoe 400 made from separable portions 402 and 404. Joint 406 between the portions is shown in FIG. 18B. The adjoining ends of the two portions are flat so that they two ends mate flat, and so that the several locking mechanisms that removably hold the portions together can pass through a double wall. Locking mechanism 410 and 420 (with receiving side structures 412 and 422) are shown. For the third locking mechanism only receiving structure 432 is illustrated. Note that in this example and in other examples, the locations where two mating portions meet, and through which the locking mechanisms pass, are preferably flat walls. This provides strength and stiffness. Also, rubber or other compliant seals can be placed between the portions at the locations where the locking mechanism pass through, to inhibit the ingress of water.

Figure 19A:
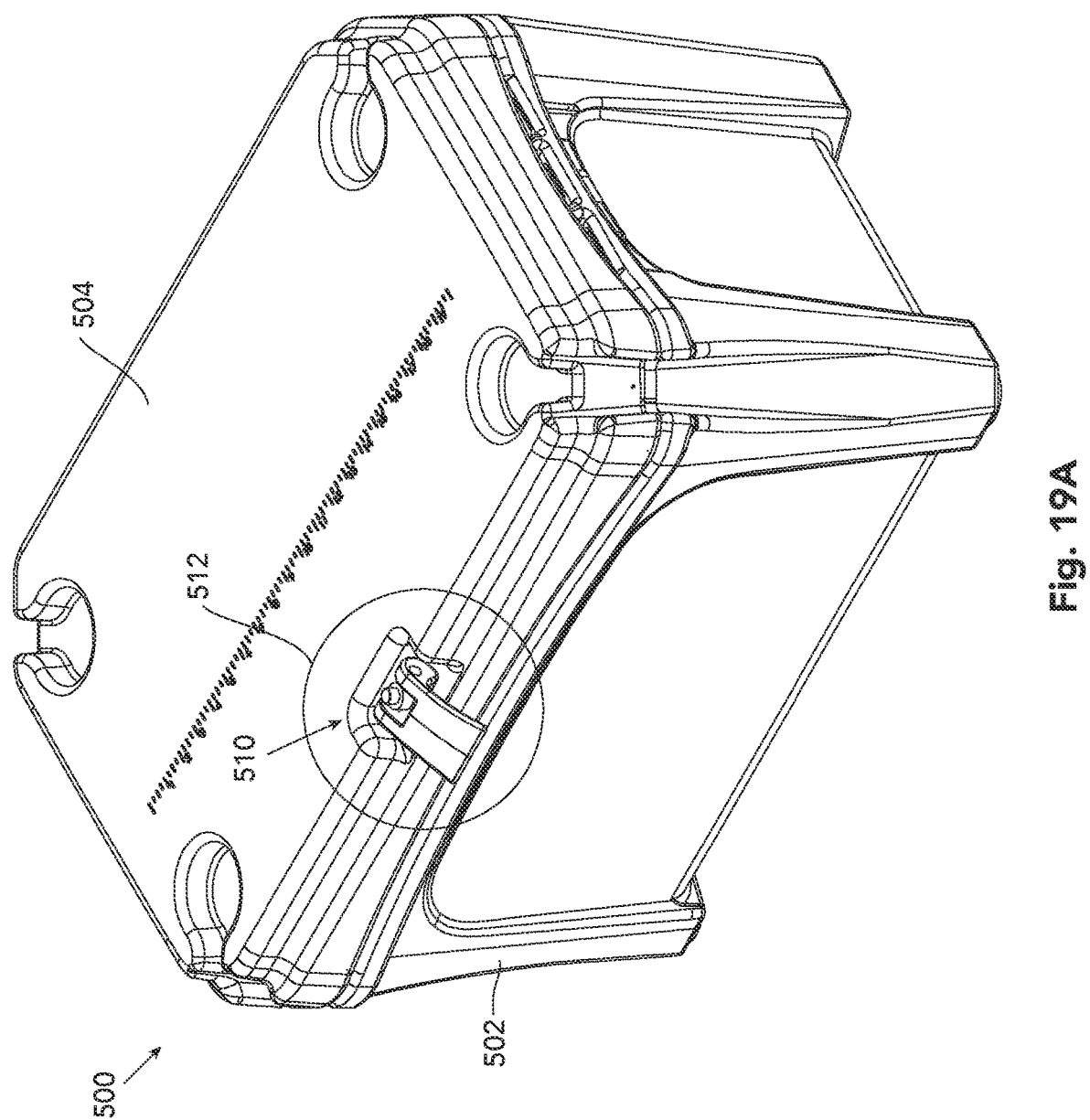
FIGS. 19A and 19B illustrate a locking mechanism in use to lock the top of a cooler.
Figure 19B:
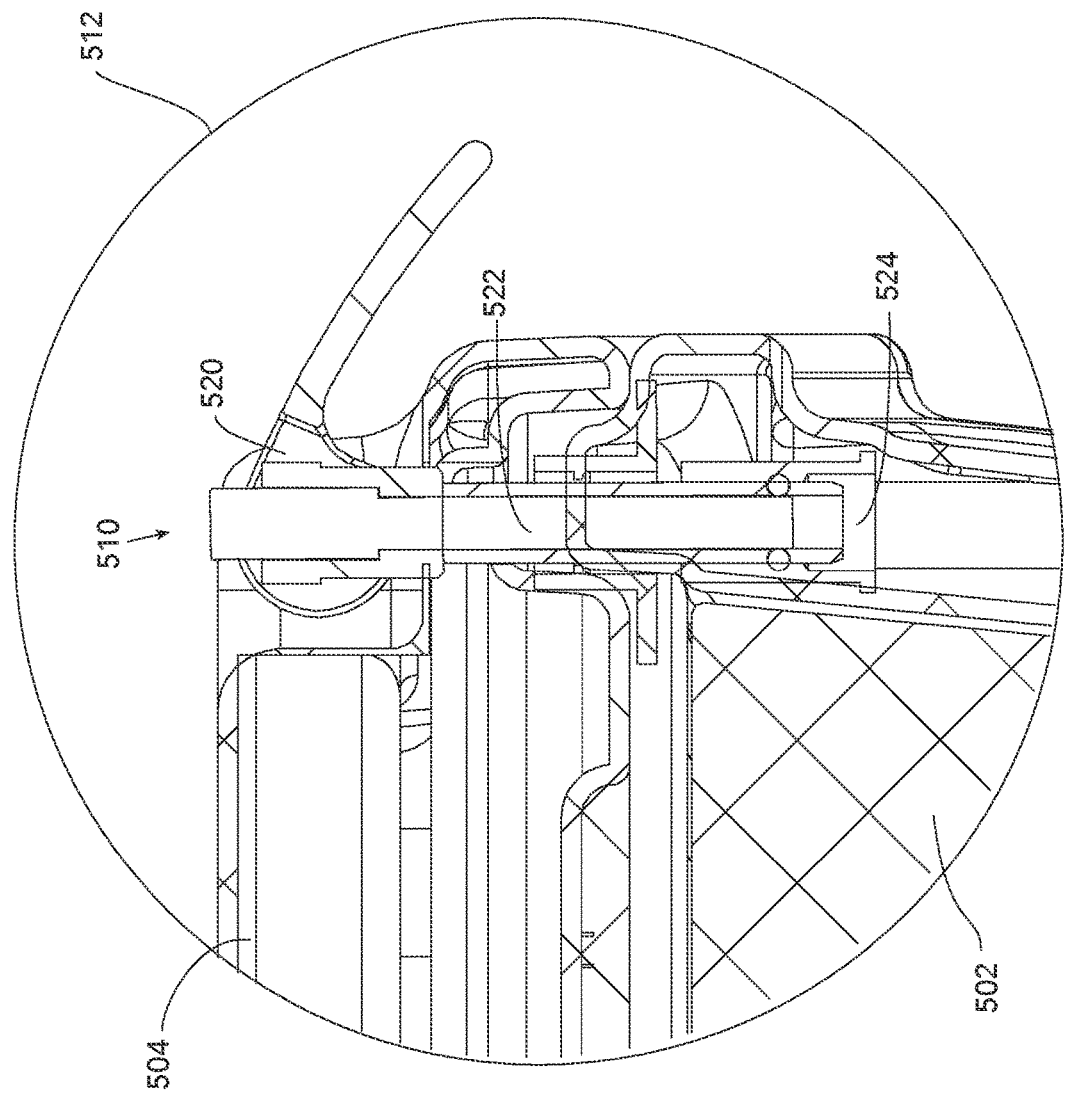

FIGS. 19A and 19B illustrate a locking mechanism in use to lock the top of a cooler 500 that has base or bottom 502 and hinged or removable top or cover 504. Locking mechanism 510 is the same as that shown in FIGS. 13 and 14, and allows the cover to be tightly closed against and locked to the bottom. Detail 512 shows that mechanism 510 includes cam handle 520, locking pin 522, and receiving collar 524.

Figures 20A, 20B:
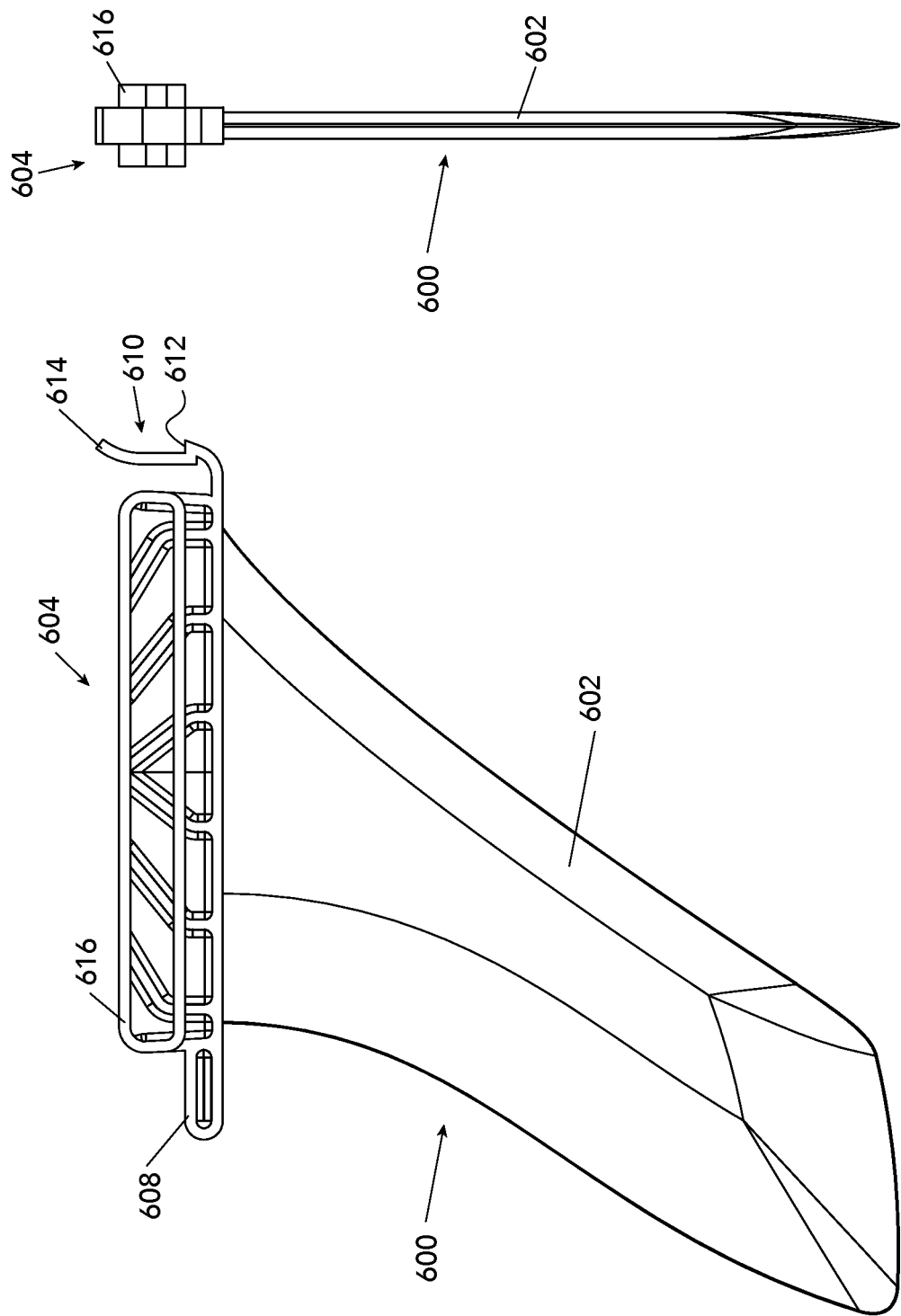
FIGS. 20A-20C are side, front and cross-sectional views of a fin for a SUP.
Figure 20C:
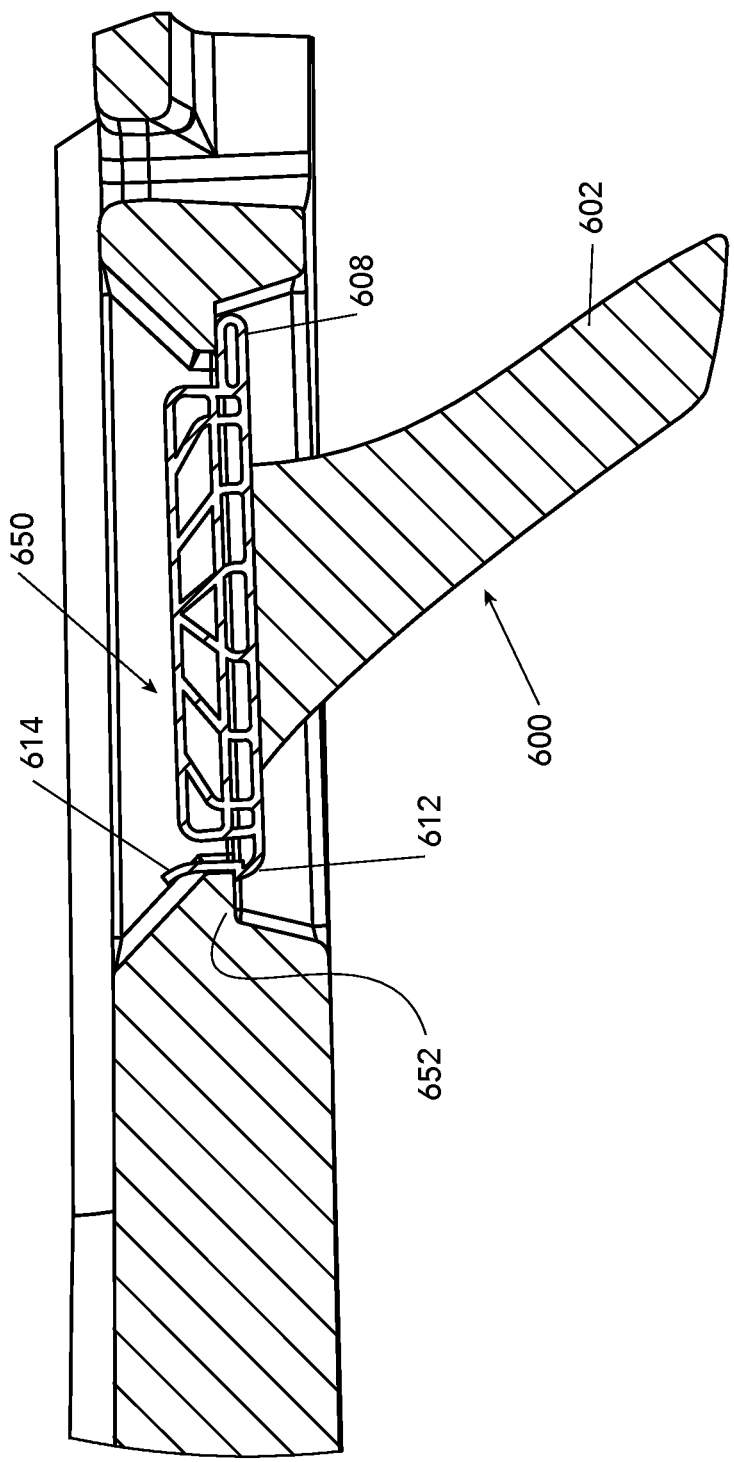

FIGS. 20A-20C are side, front and cross-sectional views of a removable stabilizing fin structure 600 for a SUP. Fin 600 is configured to sit in fin-receiving cavity 650 such that its locking/securing mechanism is below the surface and so is less likely to be inadvertently released during use of the SUP. Fin structure 600 includes top structure 604 that carries depending fin 602. Tab 608 sits underneath an overhang in the board while releasable locking feature 610 defines shoulder 612 that fits underneath overhang 652. Actuator 614 can be bent back to release shoulder 612, allowing the fin to be lifted out of cavity. 650.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An article that is configured to be assembled from multiple separate portions, comprising:
   a plurality of hollow, plastic, fully separable portions that are configured to be securely fastened together to assemble the article, wherein each portion defines an engagement surface at an end of the portion where the portion is configured to be mated to and coupled to an adjacent portion;
   a plurality of releasable locking mechanisms that are each configured to tightly compress and hold together first and second adjacent portions, wherein parts of each locking mechanism are located inside of each of the first and second adjacent portions that are configured to be joined together, proximate the engagement surfaces of the first and second adjacent portions;

wherein each locking mechanism comprises:
- a collar inside of the first portion and adjacent the engagement surface of the first portion;
- a pin and separate annular sleeve around the pin, wherein the pin is configured to move axially within the sleeve, and wherein the pin and sleeve are releasably coupled together by at least one locking ball that is located in part in the pin and in part in the sleeve;
- a receiving bore inside of the second portion and adjacent the engagement surface of the second portion;
- wherein the coupled pin and sleeve are configured to be moved from inside of the collar into the receiving bore;
- wherein the receiving bore defines an enlarged shoulder region that is configured to receive the at least one locking ball, to release the at least one locking ball from the pin but leave the locking ball in the sleeve and thereby couple the sleeve to the receiving bore and leave the pin free to move relative to the receiving bore;
- a handle that is configured to be operated so as to pull the coupled sleeve and receiving bore toward the first portion, so as to pull the second portion toward the first portion; and flexible seals on the engagement surfaces of the first and second portions, wherein the seals are compressed together when the second portion is pulled toward the first portion by operation of the handle.

2. The article of claim 1, wherein the article comprises a watercraft.

3. The article of claim 2, wherein the watercraft comprises a stand-up paddleboard (SUP).

4. The article of claim 3, wherein the SUP comprises a removable fin that is configured to be removably locked in a depression in a top surface of the SUP.

5. The article of claim 2, wherein the watercraft comprises a canoe or kayak.

6. The article of claim 1, wherein the article comprises a cooler.

7. The article of claim 1, wherein in an unlocked position the pin is located entirely in the first portion, and in a locked position the pin is located in both the first and second portions.

8. The article of claim 1, wherein engagement surfaces of the portions are flat.

9. The article of claim 8, wherein the pin is configured to pass through openings in both flat engagement surfaces.

10. The article of claim 9, wherein the flexible seals are located around the openings, to inhibit water ingress.

11. The article of claim 1 comprising a stand-up paddleboard.

12. The article of claim 1 wherein each locking mechanism further comprises a first spring around at least part of the annular sleeve, wherein the first spring is compressed when the coupled pin and sleeve are moved from inside the collar into the receiving bore.

13. The article of claim 12 wherein each locking mechanism further comprise a user-operable sliding button that is configured to be pushed in from a first position to a second position, so as to push the coupled pin and sleeve into the receiving bore.

14. The article of claim 13 wherein each locking mechanism further comprise a second spring that is configured to return the button from the second position to the first position.

* * * * *